(12) United States Patent
Shin

(10) Patent No.: US 10,997,939 B2
(45) Date of Patent: May 4, 2021

(54) DISPLAY DEVICE INCLUDING CLOCK LINE CONNECTED TO COMPENSATOR

(71) Applicant: Samsung Display Co., Ltd., Yongin-Si (KR)

(72) Inventor: Dong Hee Shin, Asan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/727,801

(22) Filed: Dec. 26, 2019

(65) Prior Publication Data

US 2020/0410951 A1    Dec. 31, 2020

(30) Foreign Application Priority Data

Jun. 27, 2019    (KR) .......................... 10-2019-0077185

(51) Int. Cl.
*G09G 3/36* (2006.01)
*G09G 3/3275* (2016.01)

(52) U.S. Cl.
CPC ......... *G09G 3/3688* (2013.01); *G09G 3/3275* (2013.01); *G09G 2300/0426* (2013.01); *G09G 2310/08* (2013.01)

(58) Field of Classification Search
CPC ............... G09G 3/3688; G09G 3/3275; G09G 2300/0426; G09G 2310/08; G09G 2320/0223

See application file for complete search history.

(56) References Cited

U.S. PATENT DOCUMENTS

| 8,004,480 B2* | 8/2011 | Kim ..................... G09G 3/3291 345/82 |
| 8,704,991 B2* | 4/2014 | Chang ................... G02F 1/1345 349/149 |
| 2008/0157364 A1* | 7/2008 | Yang ................. G02F 1/136286 257/741 |
| 2009/0184946 A1* | 7/2009 | Ahn ..................... G09G 3/3225 345/206 |
| 2017/0200420 A1* | 7/2017 | No ........................ G09G 3/3275 |

FOREIGN PATENT DOCUMENTS

| KR | 10-2016-0044177 A | 4/2016 |
| KR | 10-2017-0080848 A | 7/2017 |

* cited by examiner

*Primary Examiner* — Stephen G Sherman
(74) *Attorney, Agent, or Firm* — Innovation Counsel LLP

(57) ABSTRACT

A display device may include gate lines, clock lines, a gate driver, connection lines, and compensators. The gate driver may be electrically connected to the gate lines and disposed between the gate lines and the clock lines. The connection lines may be electrically connected to the clock lines and may transmit clock signals to the gate driver. The compensators may be respectively electrically connected to the connection lines. One of the clock lines may be electrically connected to one of the compensators and may be electrically connected to one of the connection lines. The one of the clock lines may be positioned between a first section of the one of the compensators and a first section of the one of the connection lines.

20 Claims, 19 Drawing Sheets

DISPLAY DEVICE INCLUDING CLOCK LINE CONNECTED TO COMPENSATOR

This application claims priority to Korean Patent Application No. 10-2019-0077185, filed on Jun. 27, 2019, in the Korean Intellectual Property Office; the disclosure of the Korean Patent Application is incorporated herein by reference in its entirety.

BACKGROUND

1. Field

The technical field relates to a display device.

2. Description of the Related Art

A display device may include gate lines and data lines. The gate lines may transmit gate signals provided by a gate driver. The gate driver receives clock signals from clock lines to generate the gate signals.

In the display device, an unwanted change may occur in a common voltage (applied to a common electrode) due to a coupling between the clock signals and the common voltage. As a result, horizontal stripes may appear on the screen of the display device, such that the image display quality of the display device may be unsatisfactory.

SUMMARY

Embodiment may be related to a display device capable of preventing unwanted horizontal stripes in display images. Such horizontal stripes may be caused by non-uniform capacitance between clock lines and a common electrode in a conventional display device.

According to one or more embodiments, a display device comprises: gate lines and clock lines arranged on a substrate, a gate driver connected to the gate lines and disposed between the gate lines and the clock lines, connection lines connected to the clock lines and extending from the clock lines in a first direction to transmit clock signals to the gate driver, and compensation patterns connected to the connection lines and extending in a second direction opposite to the first direction, each of the compensation pattern may overlap at least one of the clock lines in a thickness direction.

The clock lines may comprise first to fourth clock lines, the connection lines comprise first to fourth connection lines for connecting the first to fourth clock lines to the gate driver, the compensation patterns may comprise a first compensation pattern extending from the second connection line in the second direction, and the first compensation pattern overlaps the first clock line in the thickness direction.

An end of the first compensation pattern may be aligned with a side surface of the first clock line.

The compensation patterns may comprise a second compensation pattern extending from the third connection line in the second direction, and the second compensation pattern may overlap the first clock line and the second clock line in the thickness direction.

An area of the second compensation pattern may be larger than an area of the first compensation pattern.

An area in which the second compensation pattern overlaps the first clock line may be smaller than an area in which the first compensation pattern overlaps the first clock line.

An end of the second compensation pattern may be aligned with a side surface of the first clock line.

The compensation patterns may comprise a third compensation pattern extending from the fourth connection line in the second direction, and the third compensation pattern may overlap the first clock line, the second clock line, and the third clock line in the thickness direction.

An area of the third compensation pattern may be larger than an area of the second compensation pattern.

An area in which the third compensation pattern overlaps the first clock line may be smaller than an area in which the second compensation pattern overlaps the first clock line.

An end of the second compensation pattern may be aligned with a side surface of the first clock line.

The compensation patterns may comprise a fourth compensation pattern extending from the fifth connection line in the second direction, and the fourth compensation pattern may overlap the second clock line, the third clock line, and the fourth clock line in the thickness direction.

An area of the fourth compensation pattern may be larger than an area of the third compensation pattern.

The fourth compensation pattern may overlap the first clock line, and an end of the fourth compensation pattern may be aligned with a side surface of the first clock line.

According to one or more embodiments, a display device comprises: gate lines and clock lines arranged on a substrate, a gate driver connected to the gate lines and disposed between the gate lines and the clock lines, connection lines connected to the clock lines and extending from the clock lines in a first direction to transmit clock signals to the gate driver, and compensation patterns connected to the connection lines and each including a horizontal portion extending in a second direction opposite to the first direction and a vertical portion extending from an end of the horizontal portion in a third direction perpendicular to the second direction, the horizontal portion may overlap at least one of the clock lines in a thickness direction.

The vertical portion may be disposed between the clock lines, and may do not overlap the clock lines in the thickness direction.

The vertical portion may be disposed between the clock lines, and may partially overlap the clock lines in the thickness direction.

Areas of the horizontal portions of the compensation patterns may be substantially equal to each other.

Areas of the vertical portions of the compensation patterns may increase as adjacent to the gate driver.

Areas of the vertical portions of the compensation patterns may be substantially equal to each other.

An embodiment may be related to a display device. The display device may include gate lines, clock lines, a gate driver, connection lines, and compensators. The gate driver may be electrically connected to the gate lines and disposed between the gate lines and the clock lines. The connection lines may be electrically connected to the clock lines and may transmit clock signals to the gate driver. The compensators may be respectively electrically connected to the connection lines. One of the clock lines may be electrically connected to one of the compensators and may be electrically connected to one of the connection lines. The one of the clock lines may be positioned between a first section of the one of the compensators and a first section of the one of the connection lines.

The clock lines may include first clock line and a second clock line. The second clock line may be positioned between the first clock line and the gate driver. The connection lines may include a first connection line and a second connection line. The first clock line may be electrically connected through the first connection line to the gate driver. The second clock line may be electrically connected through the second connection line to the gate driver. The compensators may include a first compensator. The first compensator may be electrically connected to each of the second clock line and the second connection line. The second clock line may be positioned between a first section of the first compensator and a first section of the second connection line. The first section of the first compensator may overlap the first clock line or may be positioned between the first clock line and the second clock line.

The first section of the first compensator may be aligned with the first section of the second connection line.

The first section of the first compensator may not be aligned with the first section of the second connection line. For example, the first section of the first compensator may be perpendicular to the first section of the second connection line.

An end of the first compensator may be aligned with a side of the first clock line in a plan view of the display device.

The clock lines may include a third clock line positioned between the second clock line and the gate driver. The connection lines may include a third connection line electrically connecting the third clock line to the gate driver. The compensators may include a second compensator electrically connected to each of the third clock line and the third connection line. The third clock line may be positioned between a first section of the second compensator and a first section of the third connection line. The first section of the second compensator may overlap at least one of the first clock line and the second clock line of may be positioned between the second clock line and the third clock line.

An area of the second compensator may be larger than an area of the first compensator in a plan view of the display device.

An area in which the second compensator may overlap the first clock line may be smaller than an area in which the first compensator may overlap the first clock line.

An end of the second compensator may be aligned with a side of the first clock line in a plan view of the display device.

The clock lines may include a fourth clock line positioned between the third clock line and the gate driver. The connection lines may include a fourth connection line electrically connecting the fourth clock line to the gate driver. The compensators may include a third compensator electrically connected to each of the fourth clock line and the fourth connection line. The fourth clock line may be positioned between a first section of the third compensator and a first section of the fourth connection line. The first section of the third compensator may overlap at least one of the first clock line, the second clock line, and the third clock line or may be positioned between the third clock line and the fourth clock line.

An area of the third compensator may be larger than an area of the second compensator in a plan view of the display device.

An area in which the third compensator may overlap the first clock line may be smaller than an area in which the second compensator may overlap the first clock line.

An end of the second compensator may be aligned with a side of the first clock line in a plan view of the display device.

The clock lines may include a fifth clock line positioned between the fourth clock line and the gate driver. The connection lines may include a fifth connection line electrically connecting the fifth clock line to the gate driver. The compensators may include a fourth compensator electrically connected to each of the fifth clock line and the fifth connection line. The fifth clock line may be positioned between a first section of the fourth compensator and a first section of the fifth connection line. The first section of the fourth compensator may overlap at least one of the second clock line, the third clock line, and the fourth clock line or may be positioned between the fourth clock line and the fifth clock line.

An area of the fourth compensator may be larger than an area of the third compensator in a plan view of the display device.

The fourth compensator may overlap the first clock line. An end of the fourth compensator may be aligned with a side of the first clock line in a plan view of the display device.

The first section of the second compensator may be electrically connected through a second section of the second compensator to the first section of the third connection line and may not be aligned with (e.g., may be perpendicular to) the first section of the third connection line. The second section of the second compensator may overlap the third clock line.

The first section of the second compensator may be disposed between the second clock line and the third clock line.

The first section of the second compensator may overlap at least one the second clock line and the third clock line.

The first section of the third compensator may be electrically connected through a second section of the third compensator to the first section of the fourth connection line and may not be aligned with (e.g., may be perpendicular to) the first section of the fourth connection line. The second section of the second compensator may be aligned with the first section of the third connection line and may be directly connected to the third connection line. The second section of the third compensator may be aligned with the first section of the fourth connection line and may be directly connected to the fourth connection line. A total area of the second section of the second compensator may be substantially equal to a total area of the second section of the third compensator in a plan view of the display device.

The first section of the third compensator may be electrically connected through a second section of the third compensator to the first section of the fourth connection line, may not be aligned with (e.g., may be perpendicular to) the first section of the fourth connection line, and may be larger than the first section of the second compensator.

The first section of the third compensator may be electrically connected through a second section of the third compensator to the first section of the fourth connection line and may not be aligned with (e.g., may be perpendicular to) the first section of the fourth connection line. The second section of the second compensator may be aligned with the first section of the third connection line and may be directly connected to the third connection line. The second section of the third compensator may be aligned with the first section of the fourth connection line and may be directly connected to the fourth connection line. A total area of the first section of the second compensator may be substantially equal to a total area of the first section of the third compensator in a plan view of the display device.

DETAILED DESCRIPTION OF EMBODIMENTS

Figure 1:
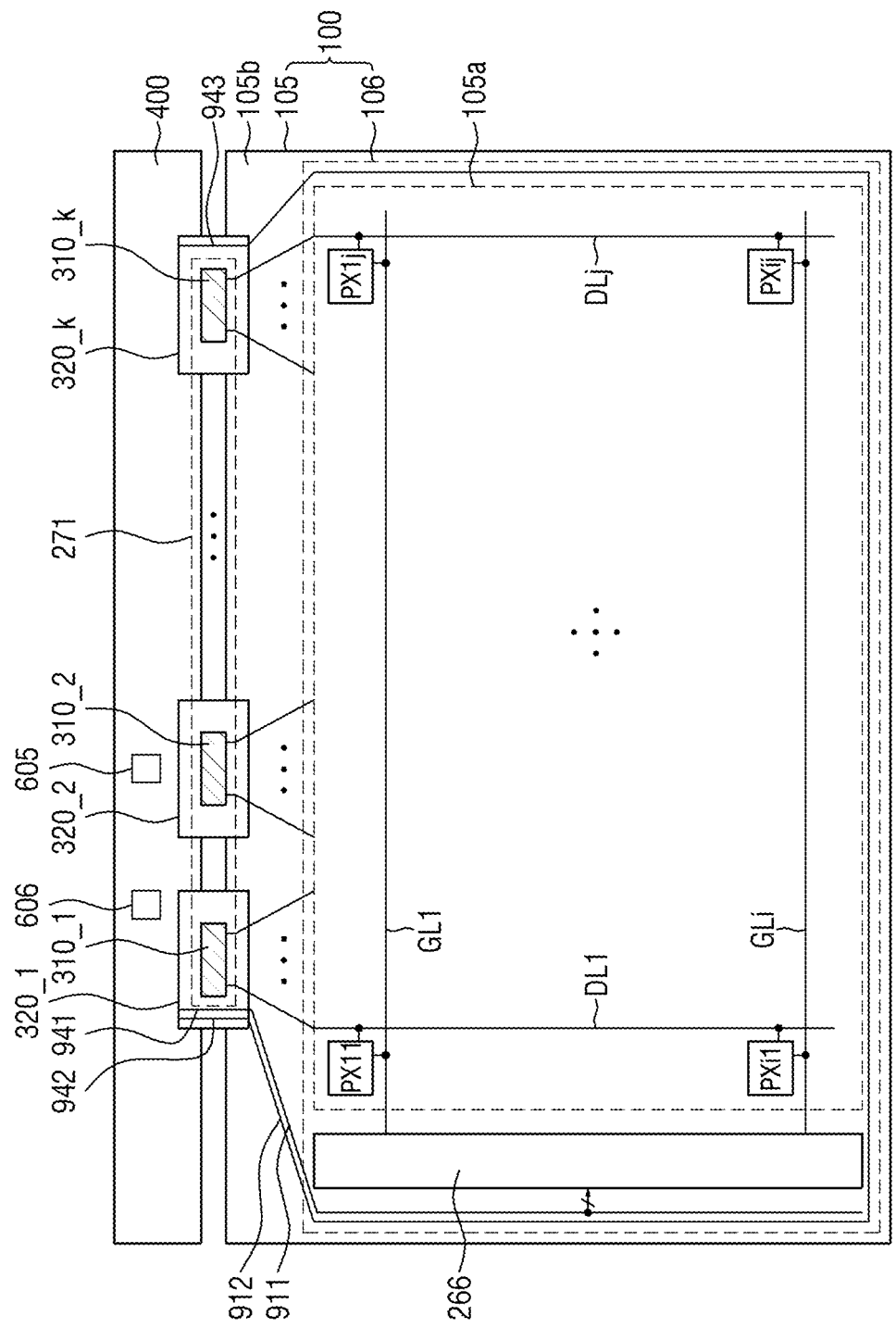
FIG. 1 is a schematic layout view of a display device according to an embodiment.

Example embodiments are described with reference to the drawings. Various embodiments may be practiced without these specific details or with one or more equivalent arrangements. Various embodiments may be different, but do not have to be exclusive. For example, specific structures, configurations, and/or characteristics of an embodiment may be used or implemented in another embodiment.

The use of cross-hatching and/or shading in the accompanying drawings is generally provided to clarify boundaries between adjacent elements. Neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. In the accompanying drawings, dimensions and/or relative dimensions of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Like reference numerals may denote like elements.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

When a first element is referred to as being "on," "connected to," or "coupled to" a second element, the first element may be directly on, directly connected to, or directly coupled to the second element, or one or more intervening elements may be present between the first element and the second element. When a first element is referred to as being "directly on," "directly connected to," or "directly coupled to" a second element, there are no intervening elements (except environmental elements such are air) present between the first element and the second element. The term "connect" may refer to physical, electrical, and/or fluid connection, with or without intervening elements.

The X-axis, the Y-axis, and the Z-axis are not limited to three axes of a Cartesian coordinate system and may be interpreted in a broader sense. For example, the X-axis, the Y-axis, and the Z-axis may be perpendicular to one another, or may represent different directions that are not perpendicular to one another.

Spatially relative terms, such as "beneath," "below," "under," "lower," "above," "upper," "over," "higher," "side" (e.g., as in "sidewall"), and the like, may be used to describe one element's relationship to another element(s) as illustrated in the drawings. Spatially relative terms may encompass different orientations of an apparatus in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and the spatially relative descriptors should be interpreted accordingly.

The terminology used herein is for the purpose of describing particular embodiments and is not intended to be limiting. The singular forms, "a," "an," and "the" may include the plural forms as well, unless the context clearly indicates otherwise. Moreover, the terms "comprises," "comprising," "includes," and/or "including" may specify the presence of stated features, integers, steps, operations, elements, components, and/or groups, but may not preclude the presence or addition of one or more other features, integers, steps, operations, elements, components, and/or groups. The terms "substantially," "about," and other similar terms, are used as terms of approximation and are utilized to account for inherent deviations in measured, calculated, and/or provided values that would be recognized by one of ordinary skill in the art.

Various embodiments are described with reference to schematic illustrations of idealized embodiments and/or intermediate structures. Variations from the shapes of the illustrations as a result, for example, of manufacturing techniques and/or tolerances are to be expected. Thus, embodiments disclosed herein should not necessarily be construed as limited to the particular illustrated shapes of regions, but are to include deviations in shapes that result from, for instance, manufacturing.

Some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. Each block, unit, and/or module may be implemented by dedicated hardware, or as a combination of dedicated hardware to perform some functions and a processor (e.g., one or more programmed microprocessors and associated circuitry) to perform other functions. A block, unit, and/or module of some embodiments may be physically separated into two or more interacting and discrete blocks, units, and/or modules. Some blocks, units, and/or modules of some embodiments may be physically combined into more complex blocks, units, and/or modules.

Unless otherwise defined, terms (including technical and scientific terms) used herein have the same meanings as commonly understood by one of ordinary skill in the art. Terms, such as those defined in commonly used dictionaries, should be interpreted as having meanings consistent with their meanings in the context of the relevant art and should not be interpreted in an idealized or overly formal sense, unless expressly so defined herein.

The term "line" may mean "line set." The term "pattern" may mean "part," "structure," or "member." The term "compensation pattern" may mean "compensator." The term "be aligned" may mean "be coplanar" and/or "coincide."

FIG. 1 is a schematic layout view of a display device according to an embodiment.

Referring to FIG. 1, the display device comprises a display panel 100, a data driver 271, a gate driver 266, a circuit board 400, a timing controller 606, and a power supply unit 605.

The display panel 100 may include a first panel 105 and a second panel 106. The first panel 105 and the second panel 106 may face each other in a thickness direction. The first panel 105 may include a display area 105a and a non-display area 105b.

The display panel 100 may be a liquid crystal panel or a light emitting diode panel. When the display panel 100 is a liquid crystal panel, a liquid crystal layer may be disposed between the first panel 105 and the second panel 106. When the display panel 100 is an organic light emitting diode panel, an organic light emitting layer may be disposed between the first panel 105 and the second panel 106.

The first panel 105 includes a plurality of gate lines GL1 to GLi, a plurality of data lines DL1 to DLj, a common line 912, and a plurality of pixels PX11 to PXij. The gate lines GL1 to GLi, the data lines DL1 to DLj, and the pixels PX11 to PXij may be disposed on a first substrate of the first panel 105.

The second panel 106 may include a light blocking layer defining a pixel area. In some embodiments, the light blocking layer may be disposed on the first panel 105. The light blocking layer prevents light from being emitted from an area other than the pixel area.

The data lines DL1 to DLj intersect the gate lines GL1 to GLi. The data lines DL1 to DLj extend to the non-display area 105b and are connected to the data driver 271.

The data driver 271 includes a plurality of data driving integrated circuits 310_1, 310_2, . . . , 310_k. The data driving integrated circuits 310_1, 310_2, . . . , 310_k receive digital image data signals and a data control signal from the timing controller 606. The data driving integrated circuits 310_1, 310_2, . . . , 310_k sample the digital image data signals according to the data control signal, and then latch the sampled digital image data signals corresponding to one horizontal line for each horizontal period and supply the latched digital image data signals to the data lines DL1 to DLj. The data driving integrated circuits 310_1, 310_2, . . . , 310_k convert the digital image data signals received from the timing controller 606 into analog image signals using a gamma voltage input from the power supply unit 605 and supply the analog image signals to the data lines DL1 to DLj.

The data driving integrated circuits 310_1, 310_2, . . . , 310_k are mounted in data carriers 320_1, 320_2, . . . , 320_k, respectively. The data carriers 320_1, 320_2, . . . , 320_k are connected to each other between the circuit board 400 and the display panel 105. For example, the data carriers 320_1, 320_2, . . . 320_k are electrically connected to each other between the circuit board 400 and the non-display area 105b of the display panel 105.

The timing controller 606 and the power supply unit 605 may be disposed on the circuit board 400.

The data carriers 320_1, 320_2, . . . , 320_k may include input lines for transmitting various signals received from the timing controller 606 and the power supply unit 605 to the data driving integrated circuits 310_1, 310_2, . . . , 310_k, and may include output lines for transmitting the image data signals output from the data driving integrated circuits 310_1, 310_2, . . . , 310_k to the corresponding data lines DL1 to DLj.

In some embodiments, the data carrier 320_k disposed at the right edge of the data carriers may include a third auxiliary line 943 for transmitting a common voltage from the power supply 605 to the first panel 105.

A first auxiliary line 941 is connected to a gate control line 911 (or gate control line set 911) of the first panel 105. The gate control line 911 transmits various signals supplied through the first auxiliary line 941 to a gate driver 266.

A common line 912 may transmit a common voltage supplied through the second and third auxiliary lines 942 and 943 to a common electrode disposed on the second panel 106. The common line 912 may extend along three sides of the display area 105a. The common electrode may be connected to the common line 912 of the first panel 105 through a short/connection portion (not shown). The common electrode receives a common voltage from the common line 912.

The gate control line 911 and the common line 912 may be formed on the non-display area 105b of the first panel 105 in a line-on-glass manner.

The pixels PX11 to PXij may be arranged in the display area 105a of the first panel 105 in a matrix form. The pixels PX11 to PXij may include a red pixel for displaying a red image, a green pixel for displaying a green image, and a blue pixel for displaying a blue image. A red pixel, a green pixel, and a blue pixel may be adjacent to each other in the horizontal direction and may constitute a unit pixel for displaying one unit image.

J pixels (hereinafter, p-th horizontal line pixels) arranged along the p-th horizontal line (p is an integer in a range of 1 to i) may be individually connected the first to j-th data lines DL1 to DLj, respectively. These p-th horizontal line pixels may be commonly connected to the p-th gate line. Accordingly, the p-th horizontal line pixels commonly receive a p-th gate signal. All of the j pixels arranged on the same horizontal line receive the same gate signal, but pixels disposed on different horizontal lines receive different gate signals.

When the display panel 100 is a light emitting diode panel, each pixel may include a driving transistor, at least one switching transistor, a light emitting device, and a capacitor.

When the display panel 100 is a liquid crystal panel, each pixel may include a pixel transistor, a liquid crystal capacitor, and an auxiliary capacitor. The pixel transistor may be a thin film transistor. Hereinafter, a case where the display panel 100 is a liquid crystal panel will be described as an example.

The pixel transistor is turned on in accordance with the gate signal from the gate line. The turned-on pixel transistor supplies an analog image data signal provided from the data line to the liquid crystal capacitor and the auxiliary capacitor.

The liquid crystal capacitor includes a pixel electrode and a portion of the common electrode which face each other.

The auxiliary capacitor includes a pixel electrode and a counter electrode which face each other. The counter electrode may be a front gate line or a transmission line for transmitting a common voltage.

The gate lines GL1 to GLi may transmit gate signals provided by the gate driver 266, and the gate driver 266 includes a shift register.

Figure 2:
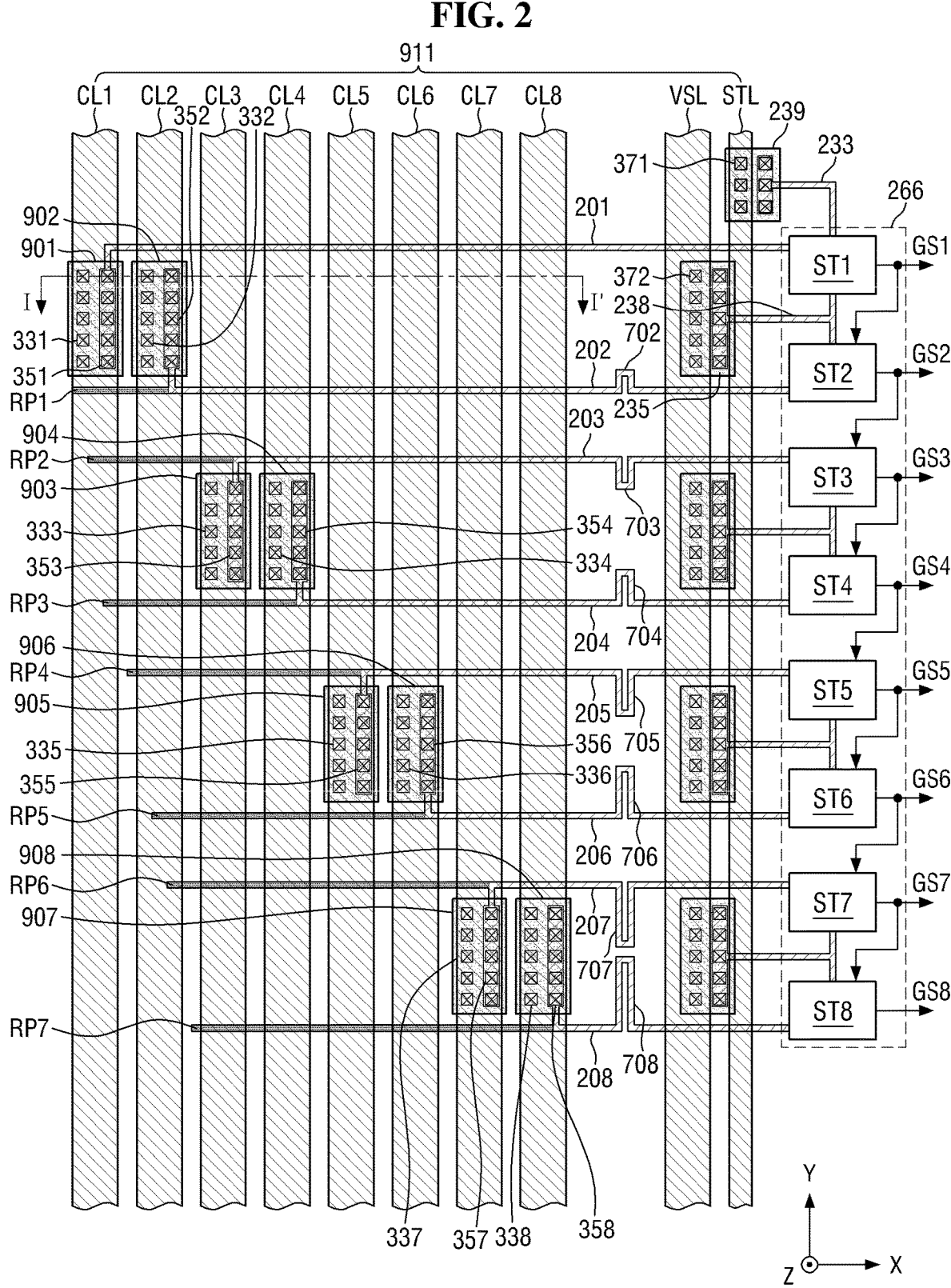
FIG. 2 is a plan schematic view showing a connection between the gate control line and grate driver of FIG. 1 according to an embodiment.
Figure 3:
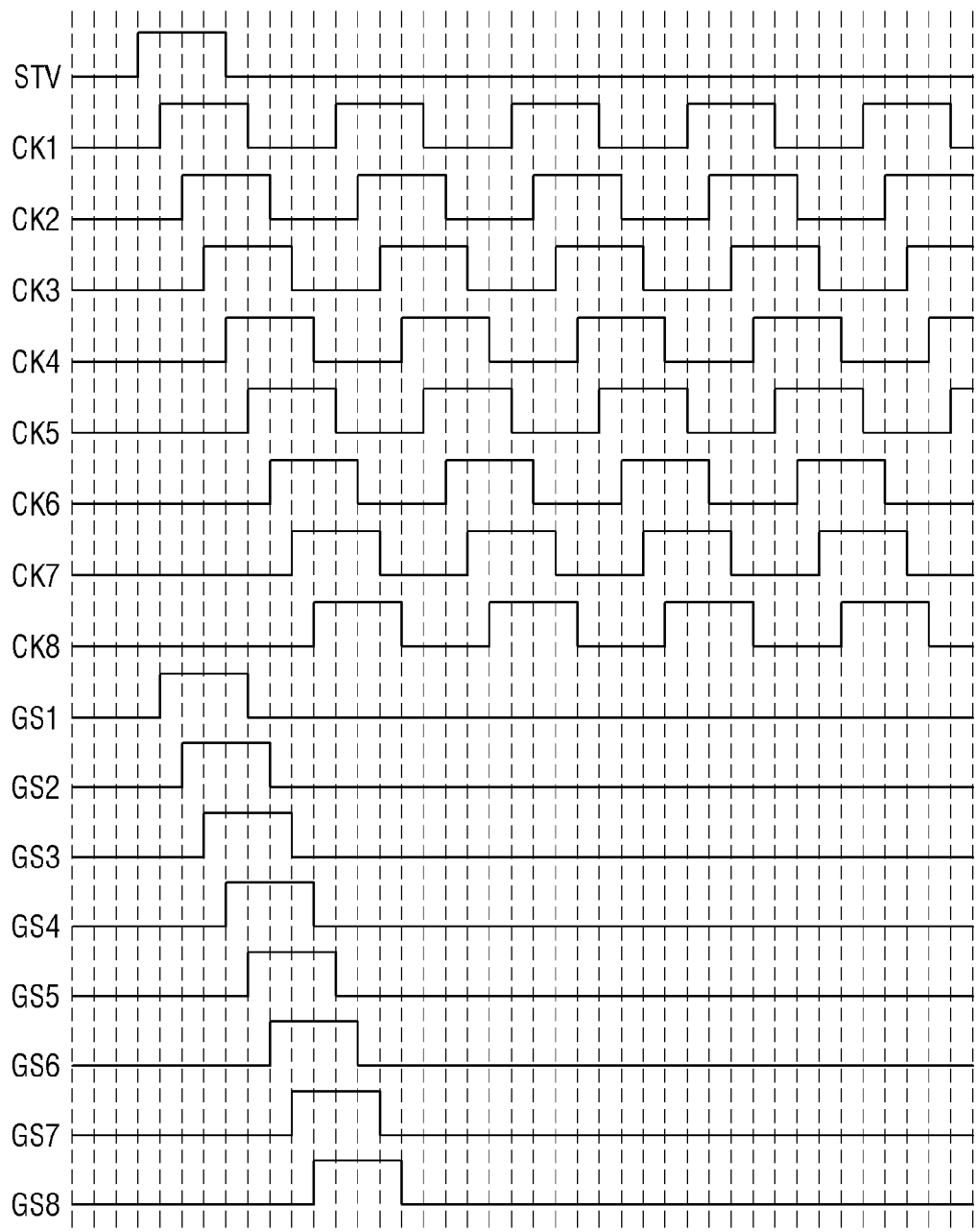
FIG. 3 is a view showing the waveforms of signals applied to the gate control line of FIG. 2 and gate signals output from the gate driver of FIG. 2 according to an embodiment.
Figure 4:
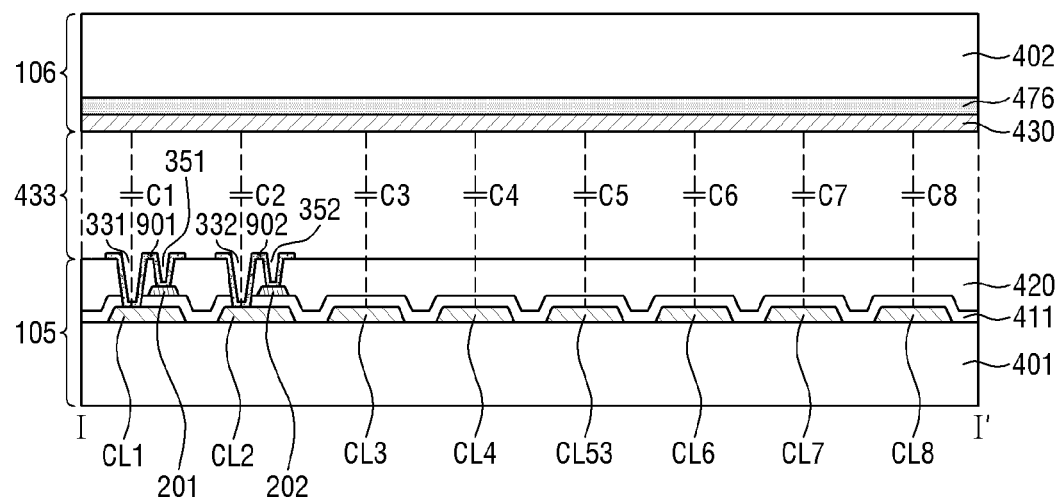
FIG. 4 is a cross-sectional view taken along the line I-I' of FIG. 2 according to an embodiment.

FIG. 2 is a schematic plan view showing a connection structure of the gate control line set and the grate driver of FIG. 1 according to an embodiment, FIG. 3 is a view showing the waveforms of signals applied to the gate control line set of FIG. 2 and gate signals output from the gate driver of FIG. 2 according to an embodiment, and FIG. 4 is a cross-sectional view taken along the line I-I' of FIG. 2 according to an embodiment. For convenience of explanation, FIG. 2 shows a part of the gate control line 911 and a part of the gate driver 266.

Referring to FIG. 2, The gate control line 911 may include a first clock line CL1, a second clock line CL2, a third clock line CL3, a fourth clock line CL4, a fifth clock line CL5, a sixth clock line CL6, a seventh clock line CL7, an eighth clock line CL8, a base line VSL, and a start line STL.

Referring to FIG. 2 together with FIG. 3, the first to eighth clock lines CL1 to CL8 may transmit the first to eighth clock signals CK1 to CK8, respectively, and the start line STL may transmit a vertical start signal STV. The clock signals CK1 to CK8 and the vertical start signal STV are provided from the timing controller 606, and the high voltage of each of the clock signals CK1 to CK8 may be a high voltage of the gate signal.

The first to eighth clock signals CK1 to CK8 may be sequentially output. Further, the first to eighth clock signals CK1 to CK8 may cycle. That is, the first clock signal CK1 to the eighth clock signal CK8 are sequentially output, and then the first clock signal CK1 to the eighth clock signal CK8 may be sequentially output again.

High sections of clock signals output in adjacent clock lines may overlap each other. For example, as shown in FIG. 3, a section corresponding to the rear ¾ length of the pulse width of the first clock signal CK1 may overlap a section corresponding to the front ¾ length of the pulse width of the second clock signal CK2 in time.

The fifth to eighth clock signals CK5 to CK8 may have phases inverted 180° with respect to the first to fourth clock signals CK1 to CK4, respectively. For example, the fifth clock signal CK5 may have a phase inverted 180° with respect to the first clock signal CK1, the sixth clock signal CK6 may have a phase inverted 180° with respect to the second clock signal CK2, the seventh clock signal CK7 may have a phase inverted 180° with respect to the third clock signal CK3, and the eighth clock signal CK8 may have a phase inverted 180° with respect to the fourth clock signal CK4.

Each of the clock signals CK1 to CK8 may be output several times during one frame period, whereas the vertical start signal STV may be output only once during one frame period. In other words, each of the clock signals CK1 to CK8 may exhibit several active states (high voltages) periodically during one frame period, whereas the vertical start signal STV may exhibit only one active state (high voltage) during one frame period.

The gate driver 266 may be disposed in the non-display area 105b of the first panel 105. The gate driver 266 may be disposed between the clock lines CL1 to CL8 and the display area 105a. The gate driver 266 may include a shift register, and the shift register may include a plurality of stages ST1 to ST8.

Each of the stages ST1 to ST8 may receive one of the first to eighth clock signals CK1 to CK8 to generate one of the first to eighth gate signals GS1 to GS8. An 8 m+1-th stage (for example, ST1) may receive the first clock signal CK1 to generate a gate signal, an 8 m+2-th stage (for example, ST2) may receive the second clock signal CK2 to generate a gate signal, an 8 m+3-th stage (for example, ST3) may receive the third clock signal CK3 to generate a gate signal, an 8 m+4-th stage (for example, ST4) may receive the fourth clock signal CK4 to generate a gate signal, an 8 m+5-th stage (for example, ST5) may receive the fifth clock signal CK5 to generate a gate signal, an 8 m+6-th stage (for example, ST6) may receive the sixth clock signal CK6 to generate a gate signal, an 8 m+7-th stage (for example, ST7) may receive the seventh clock signal CK7 to generate a gate signal, and an 8 m+8-th stage (for example, ST8) may receive the eighth clock signal CK8 to generate a gate signal. Here, m is a non-negative integer.

Each stage may be set by receiving a gate signal from the preceding stage as a start signal, and the set stage may output a received clock signal as a gate signal. For example, the second stage ST2 may be set by receiving a first gate signal GS1 from the first stage ST as a start signal, and the set second stage ST2 may output a received second clock signal CK2 as a second gate signal GS2. Each stage may be reset by receiving a gate signal from the next stage.

The first stage ST1 driven first during every frame period may receive the vertical start signal STV as a start signal. The last stage driven last during every frame period may also receive the vertical start signal STV. The last stage may be reset by receiving the vertical start signal STV.

As described above, the gate driver 266 may receive the clock signals CK1 to CK8 of eight phases. The gate driver 266 may receive clock signals of q phases. Here, q is a natural number greater than 1.

Referring to FIGS. 2 and 4, the first clock line CL1 may be connected to the gate driver 266 through a first connection line 201. For example, the first connection line 201 may connect the first clock line CL1 and the first stage ST1 of the gate driver 266 to each other. The first clock line CL1 may transmit the first clock signal CK1 in a first direction (X-axis direction).

The first clock line CL1 and the first connection line 201 may be disposed (directly) on different layers. The first clock line CL1 and the first connection line 201 may be connected by a first conductive film 901. A part of the first conductive film 901 is (directly) connected to the first clock line CL1 through a first gate contact hole 331, and another part of the first conductive film 901 may be (directly) connected to the first connection line 201 through a first source contact hole 351. The first gate contact hole 331 may penetrate a gate insulating film 411 and a protective film 420. The first clock line CL1 may be exposed by the first gate contact hole 331. The first source contact hole 351 substantially penetrates the protective film 420, and the first connection line 201 may be exposed by the first source contact hole 351.

The first connection line 201 may or may not include at least one first curved portion.

The second clock line CL2 may be connected to the gate driver 266 through a second connection line 202. For example, the second connection line 202 may connect the second clock line CL2 and the second stage ST2 of the gate driver 266 to each other. The second clock line CL2 may transmit the second clock signal CK2 in the first direction (X-axis direction).

The first compensation pattern RP1 (or first compensator RP1) may be disposed in a direction opposite to the first direction (X-axis direction) in the second connection line 202. The first compensation pattern RP1 may extend to the first clock line CL1 and may overlap the first clock line CL1. The first compensation pattern RP1 may be integrated with, directly connected to, and electrically connected to the second connection line 202. At least one of the second clock line CL2 and a second conductive film 902 may be positioned between a section of the first compensation pattern RP1 and a section of the second connection line 202. Since the first compensation pattern RP1 extends in a direction opposite to the first direction (X-axis direction), there is an advantage of not influencing the resistance of the second connection line 202.

The second clock line CL2 and the second connection line 202 may be disposed on different layers. The second clock line CL2 and the second connection line 202 may be connected by the second conductive film 902. A part of the second conductive film 902 is connected to the second clock line CL1 through a second gate contact hole 332, and another part of the second conductive film 902 may be connected to the second connection line 202 through a second source contact hole 352. The second gate contact hole 332 may penetrate the gate insulating film 411 and the protective film 420. The second clock line CL2 may be exposed by the second gate contact hole 332. The second source contact hole 352 substantially penetrates the protective film 420, and the second connection line 202 may be exposed by the second source contact hole 352.

The second connection line 202 may include at least one second curved portion 702. The length of the second curved portion 702 may be longer than the length of a corresponding first curved portion of the first connection line 201. For example, the first connection line 201 may not have a corresponding first curved portion, or the length of the corresponding first curved portion is 0, and the second curved portion 702 may have a positive length, longer than zero-length of the first curved portion.

The third clock line CL3 may be connected to the gate driver 266 through a third connection line 203. For example, the third connection line 203 may connect the third clock line CL3 and the third stage ST2 of the gate driver 266 to each other. The third clock line CL3 may transmit the third clock signal CK3 in the first direction (X-axis direction).

The second compensation pattern RP2 may be disposed in a direction opposite to the first direction (X-axis direction) in the third connection line 203. The second compensation pattern RP2 may be longer than the first compensation pattern RP1. The second compensation pattern RP2 may extend to and overlap both the second clock line CL2 and the first clock line CL1. The second compensation pattern RP2 may be integrated with, directly connected to, and electrically connected to the third connection line 203. At least one of the second clock line CL2, the third clock line CL3, and a third conductive film 903 may be positioned between a section of the second compensation pattern RP2 and a section of the third connection line 203. Since the second compensation pattern RP2 extends in a direction opposite to the first direction (X-axis direction), there is an advantage of not influencing the resistance of the third connection line 203.

The third clock line CL3 and the third connection line 203 may be disposed on different layers. The third clock line CL3 and the third connection line 203 may be connected by the third conductive film 903. A part of the third conductive film 903 is connected to the third clock line CL3 through a third gate contact hole 333, and another part of the third conductive film 903 may be connected to the third connection line 203 through a third source contact hole 353. The third gate contact hole 333 may penetrate the gate insulating film 411 and the protective film 420. The third clock line CL3 may be exposed by the third gate contact hole 333. The third source contact hole 353 substantially penetrates the protective film 420, and the third connection line 203 may be exposed by the third source contact hole 353.

The third connection line 203 may include at least one third curved portion 703. The third curved portion 703 may be longer than the second curved portion 702.

The fourth clock line CL4 may be connected to the gate driver 266 through a fourth connection line 204. For example, the fourth connection line 204 may connect the fourth clock line CL4 and the fourth stage ST4 of the gate driver 266 to each other. The fourth clock line CL4 may transmit the fourth clock signal CK4 in the first direction (X-axis direction).

The third compensation pattern RP3 may be disposed in a direction opposite to the first direction (X-axis direction) in the fourth connection line 204. The third compensation pattern RP3 may be longer than the second compensation pattern RP2. The third compensation pattern RP3 may extend to and overlap the third clock line CL3, the second clock line CL2, and the first clock line CL1. The third compensation pattern RP3 may be integrated with the fourth connection line 204. Since the third compensation pattern RP3 extends in a direction opposite to the first direction (X-axis direction), there is an advantage of not influencing the resistance of the fourth connection line 204.

The fourth clock line CL4 and the fourth connection line 204 may be disposed on different layers. The fourth clock line CL4 and the fourth connection line 204 may be connected by a fourth conductive film 904. A part of the fourth conductive film 904 is connected to the fourth clock line CL4 through a fourth gate contact hole 334, and another part of the fourth conductive film 904 may be connected to the fourth connection line 204 through a fourth source contact hole 354. The fourth gate contact hole 334 may penetrate the gate insulating film 411 and the protective film 420. The fourth clock line CL4 may be exposed by the fourth gate contact hole 334. The fourth source contact hole 354 substantially penetrates the protective film 420, and the fourth connection line 204 may be exposed by the fourth source contact hole 354.

The fourth connection line 204 may include at least one fourth curved portion 704. The fourth curved portion 704 may be longer than the third curved portion 703.

The fifth clock line CL5 may be connected to the gate driver 266 through a fifth connection line 205. For example, the fifth connection line 205 may connect the fifth clock line CL5 and the fifth stage ST5 of the gate driver 266 to each other. The fifth clock line CL5 may transmit the fifth clock signal CK5 in the first direction (X-axis direction).

The fourth compensation pattern RP4 may be disposed in a direction opposite to the first direction (X-axis direction) in the fifth connection line 205. The fourth compensation pattern RP4 may be longer than the third compensation pattern RP3. The fourth compensation pattern RP4 may extend to and overlap the fourth clock line CL4, the third clock line CL3, and the second clock line CL2. The fourth compensation pattern RP4 may be integrated with the fifth connection line 205. Since the fourth compensation pattern RP4 extends in a direction opposite to the first direction (X-axis direction), there is an advantage of not influencing the resistance of the fifth connection line 205.

The fifth clock line CL5 and the fifth connection line 205 may be disposed on different layers. The fifth clock line CL5 and the fifth connection line 205 may be connected by a fifth conductive film 905. A part of the fifth conductive film 905 is connected to the fifth clock line CL5 through a fifth gate contact hole 335, and another part of the fifth conductive film 905 may be connected to the fifth connection line 205 through a fifth source contact hole 355. The fifth gate contact hole 335 may penetrate the gate insulating film 411 and the protective film 420. The fifth clock line CL5 may be exposed by the fifth gate contact hole 335. The fifth source contact hole 355 substantially penetrates the protective film 420, and the fifth connection line 205 may be exposed by the fifth source contact hole 355.

The fifth connection line 205 may include at least one fifth curved portion 705. The fifth curved portion 705 may be longer than the fourth curved portion 704.

The sixth clock line CL6 may be connected to the gate driver 266 through a sixth connection line 206. For example, the sixth connection line 206 may connect the sixth clock line CL6 and the sixth stage ST6 of the gate driver 266 to each other. The sixth clock line CL6 may transmit the sixth clock signal CK6 in the first direction (X-axis direction).

The fifth compensation pattern RP5 may be disposed in a direction opposite to the first direction (X-axis direction) in the sixth connection line 206. The fifth compensation pattern RP5 may be longer than the fourth compensation pattern RP4. The fifth compensation pattern RP5 may extend to and overlap the fifth clock line CL5, the fourth clock line CL4, the third clock line CL3, and the second clock line CL2. The fifth compensation pattern RP5 may be integrated with the sixth connection line 206. Since the fifth compensation pattern RP5 extends in a direction opposite to the first direction (X-axis direction), there is an advantage of not influencing the resistance of the sixth connection line 206.

The sixth clock line CL6 and the sixth connection line 206 may be disposed on different layers. The sixth clock line CL6 and the sixth connection line 206 may be connected by a sixth conductive film 906. A part of the sixth conductive film 906 is connected to the sixth clock line CL6 through a sixth gate contact hole 336, and another part of the sixth conductive film 906 may be connected to the sixth connection line 206 through a sixth source contact hole 356. The sixth gate contact hole 336 may penetrate the gate insulating film 411 and the protective film 420. The sixth clock line CL6 may be exposed by the sixth gate contact hole 336. The sixth source contact hole 356 substantially penetrates the protective film 420, and the sixth connection line 206 may be exposed by the sixth source contact hole 356.

The sixth connection line 206 may include at least one sixth curved portion 706. The sixth curved portion 706 may be longer than the fifth curved portion 705.

The seventh clock line CL7 may be connected to the gate driver 266 through a seventh connection line 207. For example, the seventh connection line 207 may connect the seventh clock line CL7 and the seventh stage ST7 of the gate driver 266 to each other. The seventh clock line CL7 may transmit the seventh clock signal CK7 in the first direction (X-axis direction).

The sixth compensation pattern RP6 may be disposed in a direction opposite to the first direction (X-axis direction) in the seventh connection line 207. The sixth compensation pattern RP6 may be longer than the fifth compensation pattern RP5. The sixth compensation pattern RP6 may extend to and overlap the sixth clock line CL6, the fifth clock line CL5, the fourth clock line CL4, the third clock line CL3, and the second clock line CL2. The sixth compensation pattern RP6 may be integrated with the seventh connection line 207. Since the sixth compensation pattern RP6 extends in a direction opposite to the first direction (X-axis direction), there is an advantage of not influencing the resistance of the seventh connection line 207.

The seventh clock line CL7 and the seventh connection line 207 may be disposed on different layers. The seventh clock line CL7 and the seventh connection line 207 may be connected by a seventh conductive film 907. A part of the seventh conductive film 907 is connected to the seventh clock line CL7 through a seventh gate contact hole 337, and another part of the seventh conductive film 907 may be connected to the seventh connection line 207 through a seventh source contact hole 357. The seventh gate contact hole 337 may penetrate the gate insulating film 411 and the protective film 420. The seventh clock line CL7 may be exposed by the seventh gate contact hole 337. The seventh source contact hole 357 substantially penetrates the protective film 420, and the seventh connection line 207 may be exposed by the seventh source contact hole 357.

The seventh connection line 207 may include at least one seventh curved portion 707. The seventh curved portion 707 may be longer than the sixth curved portion 706.

The eighth clock line CL8 may be connected to the gate driver 266 through an eighth connection line 208. For example, the eighth connection line 208 may connect the eighth clock line CL8 and the eighth stage ST8 of the gate driver 266 to each other. The eighth clock line CL8 may transmit the eighth clock signal CK8 in the first direction (X-axis direction).

The seventh compensation pattern RP7 may be disposed in a direction opposite to the first direction (X-axis direction) in the eighth connection line 208. The seventh compensation pattern RP7 may be longer than the sixth compensation pattern RP6. The seventh compensation pattern RP7 may extend to and overlap the seventh clock line CL7, the sixth clock line CL6, the fifth clock line CL5, the fourth clock line CL4, and the third clock line CL3. The seventh compensation pattern RP7 may be integrated with the eighth connection line 208. Since the seventh compensation pattern RP7 extends in a direction opposite to the first direction (X-axis direction), there is an advantage of not influencing the resistance of the eighth connection line 208.

The areas of the first to seventh compensation patterns RP1 to RP7 may increase sequentially. The area of the second compensation pattern RP2 may be larger than the area of the first compensation pattern RP1, the area of the third compensation pattern RP3 may be larger than the area of the second compensation pattern RP2, the area of the fourth compensation pattern RP4 may be larger than the area of the third compensation pattern RP3, the area of the fifth compensation pattern RP5 may be larger than the area of the fourth compensation pattern RP4, the area of the sixth compensation pattern RP6 may be larger than the area of the fifth compensation pattern RP5, and the area of the seventh compensation pattern RP7 may be larger than the area of the sixth compensation pattern RP6.

The second clock line CL2 may be connected to the first compensation pattern RP1 through the second connection line 202, the third clock line CL3 may be connected to the second compensation pattern RP2 through the third connection line 203, the fourth clock line CL4 may be connected to the third compensation pattern RP3 through the fourth connection line 204, the fifth clock line CL5 may be connected to the fourth compensation pattern RP4 through the fifth connection line 205, the sixth clock line CL6 may be connected to the fifth compensation pattern RP5 through the sixth connection line 206, the seventh clock line CL7 may be connected to the sixth compensation pattern RP6 through the seventh connection line 207, and the eighth clock line CL8 may be connected to the seventh compensation pattern RP7 through the eighth connection line 208. As a clock line is closer to the gate driver 266, the clock line may be electrically connected to a larger compensation pattern. Due to the compensation patterns RP1 to RP7 extending in a direction opposite to the first direction (X-axis direction), the resistances of the connection lines may not be influenced. At the same time, the capacitance associated with the clock line far from the gate driver 266 may decrease, and the capacitance of a region adjacent to the gate driver 266 may increase. As a result, the capacitances between the clock lines CL1 to CL8 and the common electrode 430 may be desirably uniform. Advantageously, it is possible to effectively prevent unwanted horizontal stripes in a displayed image, wherein the horizontal stripes might be caused by a difference in capacitance between the clock lines CL1 to CL8 and the common electrode 430.

The eighth clock line CL8 and the eighth connection line 208 may be disposed on different layers. The eighth clock line CL8 and the eighth connection line 208 may be connected by an eighth conductive film 908. A part of the eighth conductive film 908 is connected to the eighth clock line CL8 through an eighth gate contact hole 338, and another part of the eighth conductive film 908 may be connected to the eighth connection line 208 through an eighth source contact hole 358. The eighth gate contact hole 338 may penetrate the gate insulating film 411 and the protective film 420. The eighth clock line CL8 may be exposed by the eighth gate contact hole 338. The eighth source contact hole 358 substantially penetrates the protective film 420, and the eighth connection line 208 may be exposed by the eighth source contact hole 358.

The eighth connection line 208 may include at least one eighth curved portion 708. The eighth curved portion 708 may be longer than the seventh curved portion 707.

The first clock line CL1 may be connected to a first curved portion through the first connection line 201, the second clock line CL2 is connected to the second curved portion 702 through the second connection line 202, the third clock line CL3 is connected to the third curved portion 703 through the third connection line 203, the fourth clock line CL4 is connected to the fourth curved portion 704 through the fourth connection line 204, the fifth clock line CL5 is connected to the fifth curved portion 705 through the fifth connection line 205, the sixth clock line CL6 is connected to the sixth curved portion 706 through the sixth connection line 206, the seventh clock line CL7 is connected to the seventh curved portion 707 through the seventh connection line 207, and the eighth clock line CL8 is connected to the eighth curved portion 708 through the eighth connection line 208. As a clock line is closer to the gate driver 266, the clock line is electrically connected to a longer curved portion. All of the first to eighth connection lines 201 to 208 may have the same length because of the first to eighth curved portions 702 to 708 having different lengths. Advantageously, the first to eighth connection lines 201 to 208 may have substantially equal resistances.

The eighth clock line CL8 among the first to eighth clock lines CL1 to CL8 is disposed closest to the gate driver 266. The first to eighth curved portions 702 to 708 are arranged on the gate insulating film 411 between the eighth clock line CL8 and the base line VSL. The first to eighth curved portions 702 to 708 do not overlap any clock line. The first to eighth curved portions 702 to 708 do not overlap the base line VSL and the start line STL.

The base line VSL is connected to each of the stages ST1 to ST8 of the gate driver 266. The base line VSL transmits a base voltage. The base voltage is a direct current voltage. Each stage generates a low voltage of a gate signal using the base voltage. The base line VSL is disposed on the same layer as the first to eighth clock lines CL1 to CL8. The base line VSL is connected to each of the stages ST1 to ST8 through a contact hole 372, a connection line 238, and a conductive film 235.

The start line STL is connected to the first stage ST1 and the last stage. The start line STL is disposed on the same layer as the first to eighth clock lines CL1 to CL8. The start line STL is connected to the first stage ST1 and the last stage through a contact hole 371, a connection line 233, and a conductive film 239.

The first to eighth clock lines CK1 to CL8 are disposed on the first substrate 401 of the first panel 105. The first to eighth connection lines 201 to 208, the first to eighth source compensation patterns 502 to 508, the first to eighth curved portions 702 to 708, the base line VSL, and the start line STL are disposed on the first substrate 401. The first panel 105 includes a gate insulating film 411 and a protective film 420 in addition to the first substrate 401.

The gate insulating film 411 is disposed on the first to eighth connection lines 201 to 208, the first to eighth source compensation patterns 502 to 508, the first to eighth curved portions 702 to 708, the base line VSL, and the start line STL. The protective film 420 is disposed on the gate insulating film 411.

The second panel 106 includes a second substrate 402, a light blocking layer 476, and a common electrode 430. The light blocking layer 476 is disposed on the second substrate 402, and the common electrode 430 is disposed on the light blocking layer 476. The common electrode 430 is disposed on substantially an entire surface of the second substrate 402 that overlaps the light blocking layer 476. Accordingly, the first to eighth clock lines CL1 to CL8, first to eighth connection lines 201 to 208, first to seventh compensation patterns RP1 to RP7, first to eighth curved portions 702 to 708, base line VSL, start line STL, and gate driver 266 of the first substrate 401 overlap the common electrode 430 of the second substrate 402. A liquid crystal layer 433 is disposed between the first panel 105 and the second panel 106.

The first clock line CL1, the first connection line 201, and the first curved portion are defined as a first clock transmitter. The second clock line CL2, the second connection line 202, the first compensation pattern RP1, and the second curved portion 702 are defined as a second clock transmitter. The third clock line CL3, the third connection line 203, the second compensation pattern RP2, and the third curved portion 703 are defined as a third clock transmitter. The fourth clock line CL4, the fourth connection line 204, the third compensation pattern RP3, and the fourth curved portion 704 are defined as a fourth clock transmitter. The fifth clock line CL5, the fifth connection line 205, the fourth compensation pattern RP4, and the fifth curved portion 705 are defined as a fifth clock transmitter. The sixth clock line CL6, the sixth connection line 206, the fifth compensation pattern RP5, and the sixth curved portion 706 are defined as a sixth clock transmitter. The seventh clock line CL7, the seventh connection line 207, the sixth compensation pattern RP6, and the seventh curved portion 707 are defined as a seventh clock transmitter. The eighth clock line CL8, the eighth connection line 208, the seventh compensation pattern RP7, and the eighth curved portion 708 are defined as an eighth clock transmitter.

A capacitor is formed between each clock transmitter and the common electrode 430. For example, as shown in FIG. 4, the first capacitor C1 is formed between the first clock transmitter and the common electrode 430, the second capacitor C2 is formed between the second clock transmitter and the common electrode 430, the third capacitor C3 is formed between the third clock transmitter and the common electrode 430, the fourth capacitor C4 is formed between the fourth clock transmitter and the common electrode 430, the fifth capacitor C5 is formed between the fifth clock transmitter and the common electrode 430, the sixth capacitor C6 is formed between the sixth clock transmitter and the common electrode 430, the seventh capacitor C7 is formed between the seventh clock transmitter and the common electrode 430, and the eighth capacitor C8 is formed between the eighth clock transmitter and the common electrode 430.

Since the first to seventh compensation patterns RP1 to RP7 extend in a direction opposite to the first direction (X-axis direction), the overlapping areas of the clock lines and compensation patterns far from the gate driver 266 are increased to decrease the capacitances associated with the clock lines far from the gate driver 266. At the same time, the lengths of the compensation patterns of the clock lines close to the gate driver 266 are increased to increase the capacitances of associated with the clock lines close to the gate driver 266. As a result, the capacitances of the first to eighth capacitors C1 to C8 may be substantially uniform. Advantageously, unwanted variation of the common voltage can be minimized, unwanted horizontal stripes can be effectively prevented in display images, and satisfactory image display quality of the display device may be attained.

Figure 5:
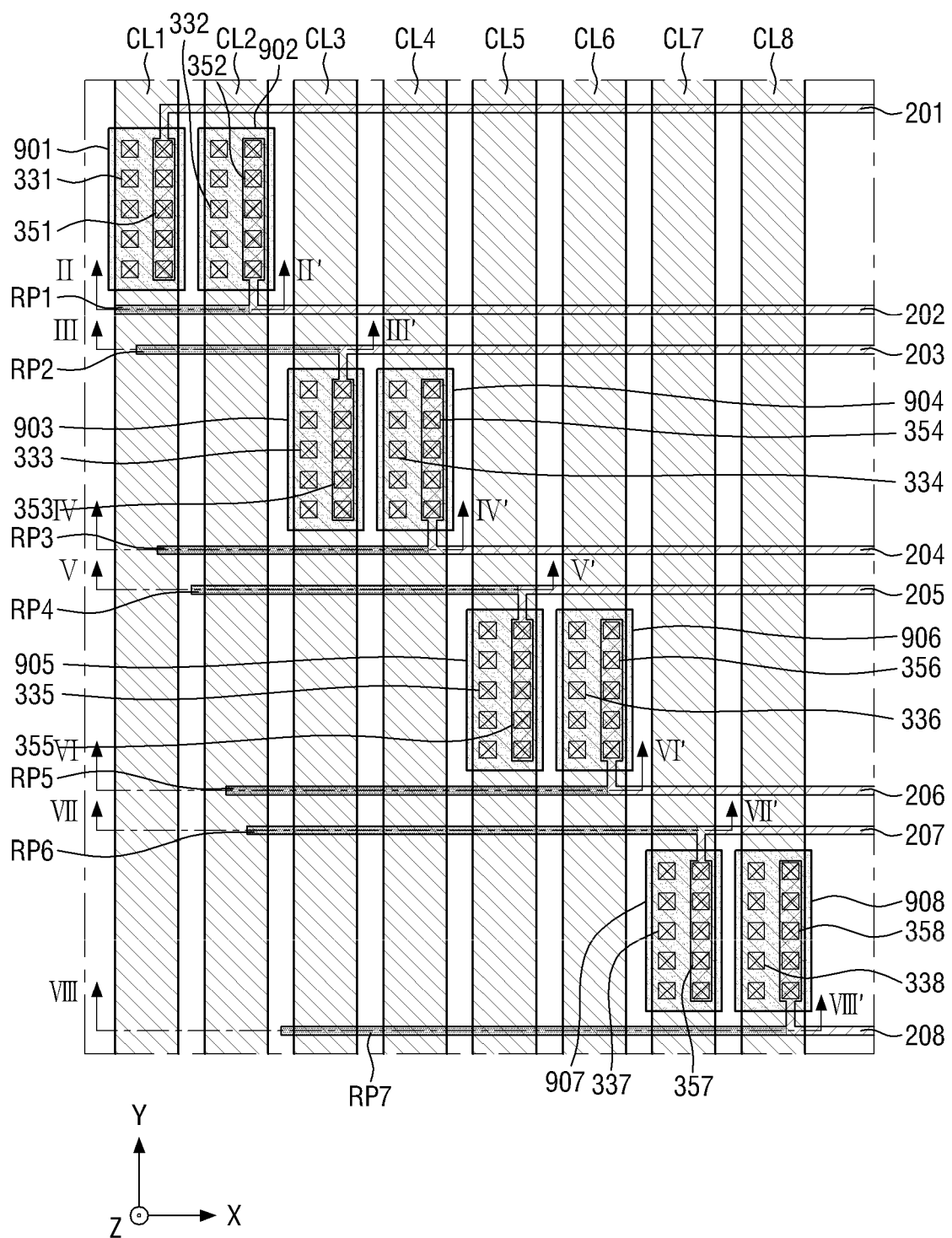
FIG. 5 is a schematic view showing structural relations between clock lines and compensation patterns according to an embodiment.
Figure 6:
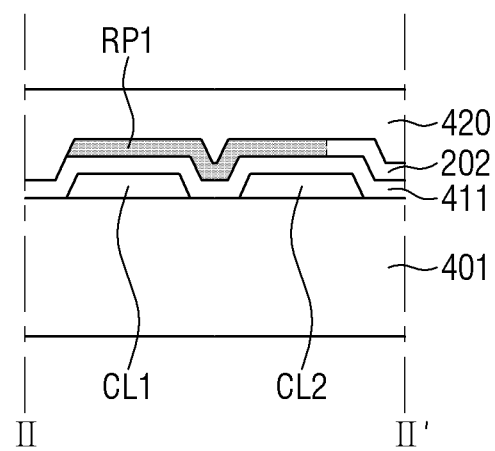
FIG. 6 is a cross-sectional view taken along the line II-IT of FIG. 5 according to an embodiment.
Figure 6:
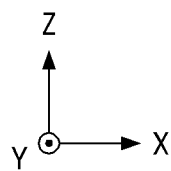
Figure 7:
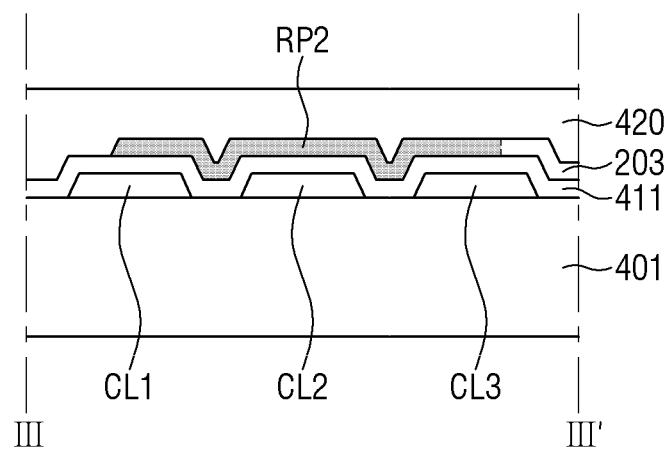
FIG. 7 is a cross-sectional view taken along the line III-III' of FIG. 5 according to an embodiment.
Figure 8:
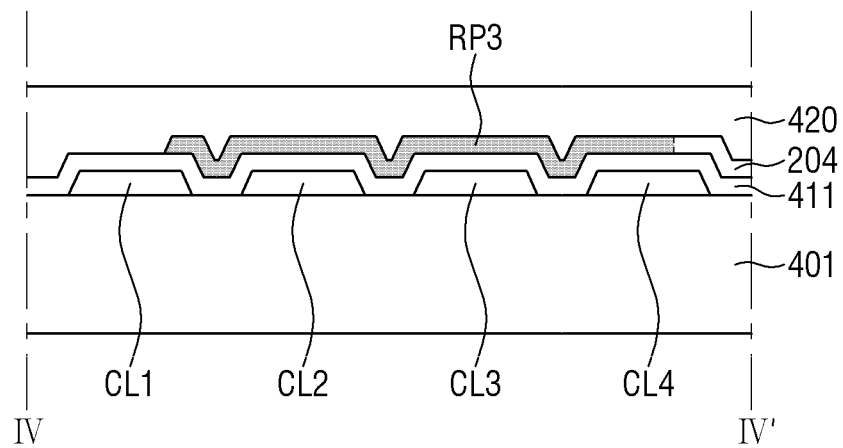
FIG. 8 is a cross-sectional view taken along the line IV-IV' of FIG. 5 according to an embodiment.
Figure 9:
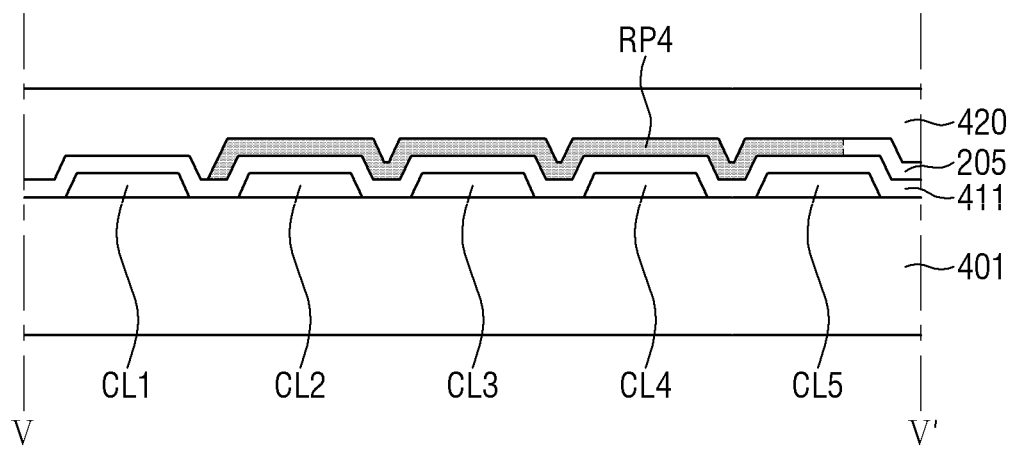
FIG. 9 is a cross-sectional view taken along the line V-V' of FIG. 5 according to an embodiment.
Figure 10:
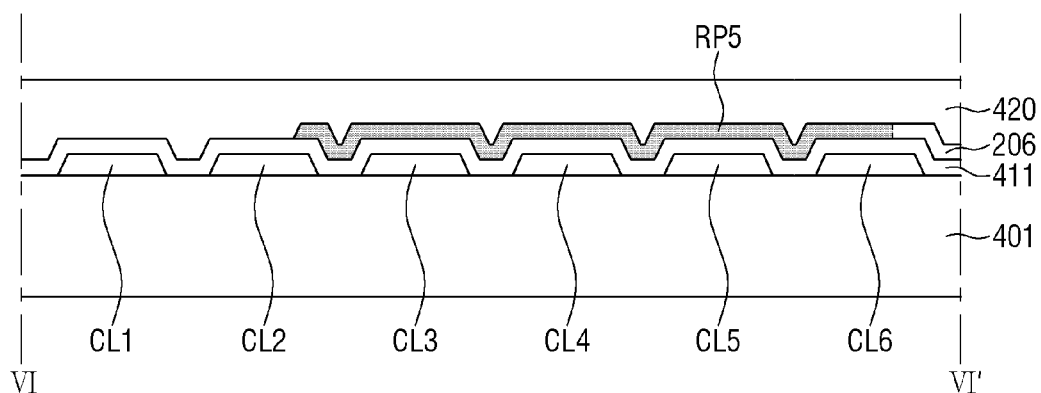
FIG. 10 is a cross-sectional view taken along the line VI-VI' of FIG. 5 according to an embodiment.
Figure 10:
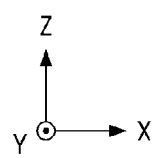
Figure 11:
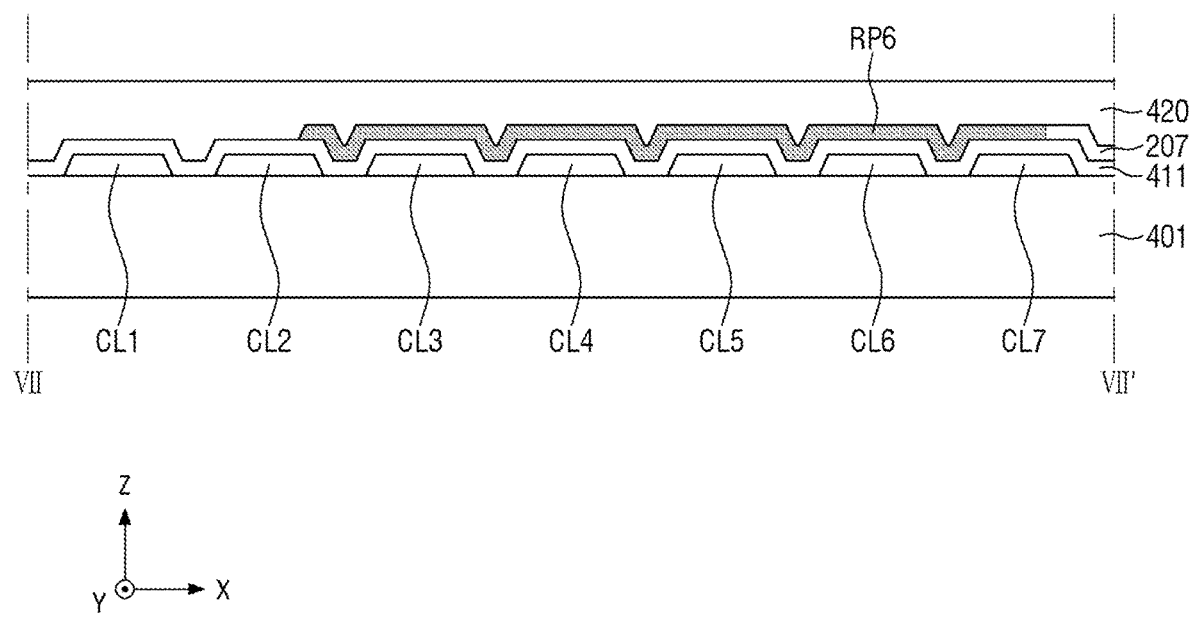
FIG. 11 is a cross-sectional view taken along the line VII-VII' of FIG. 5 according to an embodiment.
Figure 12:
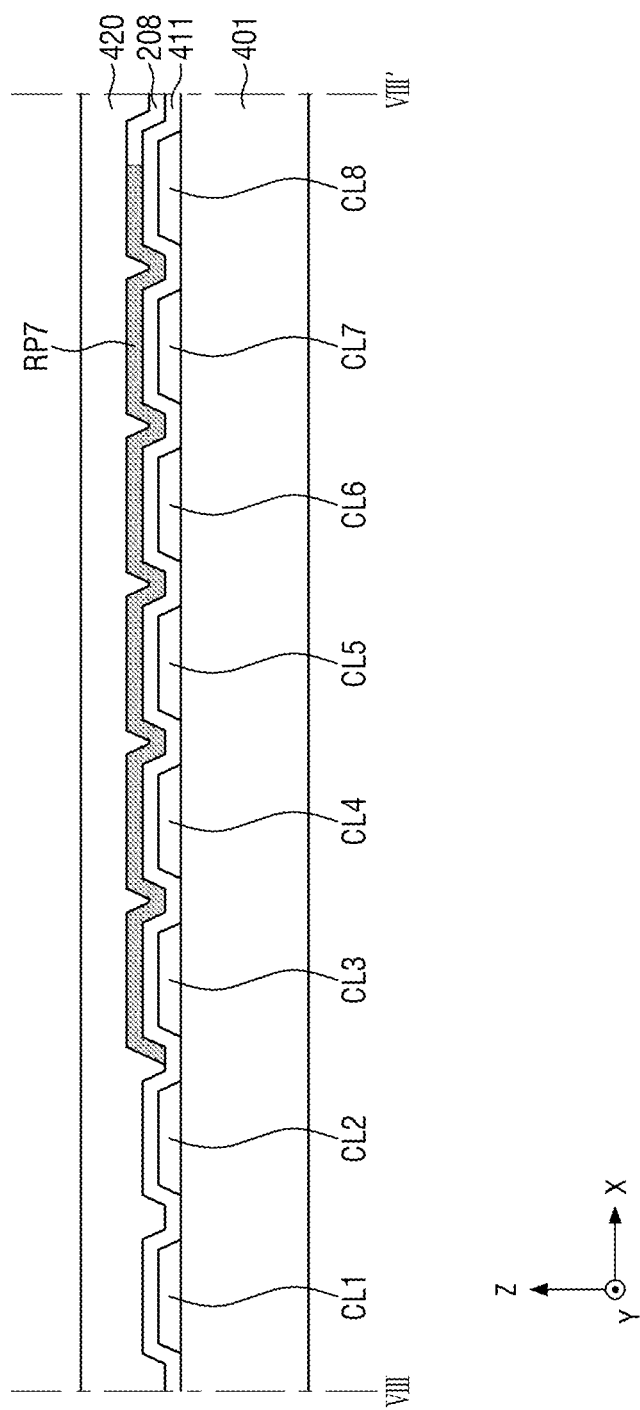
FIG. 12 is a cross-sectional view taken along the line VIII-VIII' of FIG. 5 according to an embodiment.

FIG. 5 is a schematic view showing structural relations between clock lines and compensation patterns according to an embodiment. FIG. 6 is a cross-sectional view taken along the line II-IT of FIG. 5 according to an embodiment. FIG. 7 is a cross-sectional view taken along the line III-III' of FIG. 5 according to an embodiment. FIG. 8 is a cross-sectional view taken along the line IV-IV' of FIG. 5 according to an embodiment. FIG. 9 is a cross-sectional view taken along the line V-V' of FIG. 5 according to an embodiment. FIG. 10 is a cross-sectional view taken along the line VI-VI' of FIG. 5 according to an embodiment. FIG. 11 is a cross-sectional view taken along the line VII-VII' of FIG. 5 according to an embodiment. FIG. 12 is a cross-sectional view taken along the line VIII-VIII' of FIG. 5 according to an embodiment.

Referring to FIGS. 5 and 6, the first compensation pattern RP1 may extend from the second connection line 202 in a direction opposite to the first direction (X-axis direction). The first compensation pattern RP1 may overlap a part of the second clock line CL2 and the first clock line CL1 in the third direction (Z-axis direction) with the gate insulating film 411 interposed in between.

Although it is shown in FIG. 5 that the first compensation pattern RP1 and the second connection line 202 have the same width in the second direction (Y-axis direction), the first compensation pattern RP1 and the second connection line 202 may have different widths from each other. The width of the first compensation pattern RP1 in the second direction (Y-axis direction) may be larger than the width of the second connection line in the second direction (Y-axis direction).

In some embodiments, a first end of the first compensation pattern RP1 may be in contact with the second connection line 202, and a second end of the first compensation pattern RP1 may be aligned/coplanar with and/or may coincide with a side surface of the first clock line CL1 in the second direction (Y-axis direction). The side surface of the first clock line CL1 refers to a side surface disposed in a direction opposite to the first direction (X-axis direction). However, the second end of the first compensation pattern RP1 may protrude from the first clock line CL1 in a direction opposite to the first direction (X-axis direction). The first compensation pattern RP1 may serve to increase the capacitance of the first capacitor C1 (illustrated in FIG. 4) and to increase the capacitance of the second capacitor C2.

Although the first compensation pattern RP1 may be integrated with the second connection line 202, the first compensation pattern RP1 extends in the direction opposite to the first direction (X-axis direction), and thus there is an advantage of not influencing the resistance of the second connection line 202.

Referring to FIGS. 5 and 7, the second compensation pattern RP2 may extend from the third connection line 203 in a direction opposite to the first direction (X-axis direction). The second compensation pattern RP2 may overlap a part of the third clock line CL3, the second clock line CL2, and a part of the first clock line CL1 in the third direction (Z-axis direction) with the gate insulating film 411 interposed in between.

In some embodiments, one end of the second compensation pattern RP2 may be in contact with the third connection line 203, and the other end of the second compensation pattern RP2 may disposed over the first clock line. That is, the overlapping area of the second compensation pattern RP2 and the first clock line CL1 may be smaller than the overlapping area of the first compensation pattern RP1 and the first clock line CL1.

The area of the second compensation pattern RP2 may be larger than the area of the first compensation pattern RP1. The second compensation pattern RP2 and the first compensation pattern RP1 may have the same width in the second direction (Y-axis direction), and the second compensation pattern RP1 may be longer than the first compensation pattern RP1 in a direction opposite to the first direction (X axis direction). In some embodiments, the second compensation pattern RP2 and the first compensation pattern RP1 have the same extending length in a direction opposite to the first direction (X axis direction), and the width of the second compensation pattern RP2 in the second direction (Y-axis direction) may be larger than the width of the first compensation pattern RP1 in the second direction (Y-axis direction).

The second compensation pattern RP2 may serve to decrease the capacitance of the first capacitor C1 and the capacitance of the second capacitor C2 adjacent to the first capacitor C1 and to increase the capacitance of the third capacitor C3.

Although the second compensation pattern RP2 may be integrated with the third connection line 203, the second compensation pattern RP2 extends in a direction opposite to the first direction (X-axis direction), and thus there is an advantage of not influencing the resistance of the third connection line 203.

Referring to FIGS. 5 and 8, the third compensation pattern RP3 may extend from the fourth connection line 204 in a direction opposite to the first direction (X-axis direction). The third compensation pattern RP3 may overlap a part of the fourth clock line CL4, the third clock line CL3, the second clock line CL2, and a part of the first clock line CL1 in the third direction (Z-axis direction) with the gate insulating film 411 interposed in between.

In some embodiments, one end of the third compensation pattern RP3 may be in contact with the fourth connection line 204, and the other end of the third compensation pattern RP3 may disposed over the first clock line CL1. That is, the overlapping area of the third compensation pattern RP3 and the first clock line CL1 may be smaller than the overlapping area of the second compensation pattern RP2 and the first clock line CL1.

The area of the third compensation pattern RP3 may be larger than the area of the second compensation pattern RP2. The third compensation pattern RP3 and the second compensation pattern RP2 may have the same width in the second direction (Y-axis direction), and the third compensation pattern RP3 may be longer than the second compensation pattern RP2 in a direction opposite to the first direction (X axis direction).

The third compensation pattern RP3 may serve to decrease the capacitance of the first capacitor C1, the capacitance of the second capacitor C2 adjacent to the first capacitor C1, and the capacitance of the third capacitor C and to increase the capacitance of the fourth capacitor C4.

Although the third compensation pattern RP3 may be integrated with the fourth connection line 204, the third compensation pattern RP3 extends in a direction opposite to the first direction (X-axis direction), and thus there is an advantage of not influencing the resistance of the fourth connection line 204.

Referring to FIGS. 5 and 9, the fourth compensation pattern RP4 may extend from the fifth connection line 205 in a direction opposite to the first direction (X-axis direction). The fourth compensation pattern RP4 may overlap a part of the fifth clock line CL5, the fourth clock line CL4, the third clock line CL3, and the second clock line CL2 in the third direction (Z-axis direction) with the gate insulating film 411 interposed in between.

In some embodiments, one end of the fourth compensation pattern RP4 may be in contact with the fifth connection line 205, and the other end of the fourth compensation pattern RP4 may disposed over a space between the first clock line CL1 and the second clock line CL2. That is, the fourth compensation pattern RP4 may overlap the second clock line CL2, but may not overlap the first clock line CL1. However, the other end of the fourth compensation pattern RP4 may be disposed over the first clock line CL1, and the fourth compensation pattern RP4 may overlap a part of the first clock line CL1. In this case, the overlapping area of the fourth compensation pattern RP4 and the first clock line CL1 may be smaller than the overlapping area of the third compensation pattern RP3 and the first clock line CL1.

The area of the fourth compensation pattern RP4 may be larger than the area of the third compensation pattern RP3. The fourth compensation pattern RP4 and the third compensation pattern RP3 may have the same width in the second direction (Y-axis direction), and the fourth compensation pattern RP4 may be longer than the third compensation pattern RP3 in a direction opposite to the first direction (X axis direction).

The fourth compensation pattern RP4 may serve to decrease the capacitance of the second capacitor C2 of FIG. 4, the capacitance of the third capacitor C3, and the capacitance of the fourth capacitor C4, and to increase the capacitance of the fifth capacitor C5.

Although the fourth compensation pattern RP4 may be integrated with the fifth connection line 205, the fourth compensation pattern RP4 extends in a direction opposite to the first direction (X-axis direction), and thus there is an advantage of not influencing the resistance of the fifth connection line 205.

Referring to FIGS. 5 and 10, the fifth compensation pattern RP5 may extend from the sixth connection line 206 in a direction opposite to the first direction (X-axis direction). The fifth compensation pattern RP5 may overlap a part of the sixth clock line CL6, the fifth clock line CL5, the fourth clock line CL4, the third clock line CL3, and a part of the second clock line CL2 in the third direction (Z-axis direction) with the gate insulating film 411 interposed in between.

In some embodiments, one end of the fifth compensation pattern RP5 may be in contact with the sixth connection line 206, and the other end of the fifth compensation pattern RP5 may disposed over the second clock line CL2. That is, the overlapping area of the fifth compensation pattern RP5 and the second clock line CL2 may be smaller than the overlapping area of the fourth compensation pattern RP4 and the second clock line CL2.

The area of the fifth compensation pattern RP5 may be larger than the area of the fourth compensation pattern RP4. The fifth compensation pattern RP5 and the fourth compensation pattern RP4 may have the same width in the second direction (Y-axis direction), and the fifth compensation pattern RP5 may be longer than the extending fourth compensation pattern RP4 in a direction opposite to the first direction (X axis direction).

The fifth compensation pattern RP5 may serve to decrease the capacitance of the second capacitor C2, the capacitance of the third capacitor C3, the capacitance of the fourth capacitor C4, and the capacitance of the fifth capacitor C5, and to increase the capacitance of the sixth capacitor C6.

Although the fifth compensation pattern RP5 may be integrated with the sixth connection line 206, the fifth compensation pattern RP5 extends in a direction opposite to the first direction (X-axis direction), and thus there is an advantage of not influencing the resistance of the sixth connection line 206.

Referring to FIGS. 5 and 11, the sixth compensation pattern RP6 may extend from the seventh connection line 207 in a direction opposite to the first direction (X-axis direction). The sixth compensation pattern RP6 may overlap a part of the seventh clock line CL7, the sixth clock line CL6, the fifth clock line CL5, the fourth clock line CL4, the third clock line CL3, and a part of the second clock line CL2 in the third direction (Z-axis direction) with the gate insulating film 411 interposed in between.

In some embodiments, one end of the sixth compensation pattern RP6 may be in contact with the seventh connection line 207, and the other end of the sixth compensation pattern RP6 may disposed over the second clock line CL2. That is, the overlapping area of the sixth compensation pattern RP6 and the second clock line CL2 may be smaller than the overlapping area of the fifth compensation pattern RP5 and the second clock line CL2.

The area of the sixth compensation pattern RP6 may be larger than the area of the fifth compensation pattern RP5. The sixth compensation pattern RP6 and the fifth compensation pattern RP5 may have the same width in the second direction (Y-axis direction), and the sixth compensation pattern RP6 may be longer than the fifth compensation pattern RP5 in a direction opposite to the first direction (X axis direction).

The sixth compensation pattern RP6 may serve to decrease the capacitance of the second capacitor C2, the capacitance of the third capacitor C3, the capacitance of the fourth capacitor C4, the capacitance of the fifth capacitor C5, and the capacitance of the sixth capacitor C6, and to increase the capacitance of the seventh capacitor C7.

Although the sixth compensation pattern RP6 may be integrated with the seventh connection line 207, the sixth compensation pattern RP6 extends in a direction opposite to the first direction (X-axis direction), and thus there is an advantage of not influencing the resistance of the seventh connection line 207.

Referring to FIGS. 5 and 12, the seventh compensation pattern RP7 may extend from the eighth connection line 208 in a direction opposite to the first direction (X-axis direction). The seventh compensation pattern RP7 may overlap a part of the eighth clock line CL8, the seventh clock line CL7, the sixth clock line CL6, the fifth clock line CL5, the fourth clock line CL4, and the third clock line CL3 in the third direction (Z-axis direction) with the gate insulating film 411 interposed in between.

In some embodiments, one end of the seventh compensation pattern RP7 may be in contact with the eighth connection line 208, and the other end of the seventh compensation pattern RP7 may disposed over a space between the second clock line CL2 and the third clock line CL3. That is, the seventh compensation pattern RP7 may overlap the third clock line CL3, but may not overlap the second clock line CL2. However, the other end of the seventh compensation pattern RP7 may be disposed over the second clock line CL2, and the seventh compensation pattern RP7 may overlap a part of the second clock line CL2. In this case, the overlapping area of the seventh compensation pattern RP7 and the second clock line CL2 may be smaller than the overlapping area of the sixth compensation pattern RP6 and the second clock line CL1.

The area of the seventh compensation pattern RP7 may be larger than the area of the sixth compensation pattern RP6.

The seventh compensation pattern RP7 and the sixth compensation pattern RP6 may have the same width in the second direction (Y-axis direction), and the seventh compensation pattern RP7 may be longer than the extending sixth compensation pattern RP6 in a direction opposite to the first direction (X axis direction).

The seventh compensation pattern RP7 may serve to decrease the capacitance of the third capacitor C3, the capacitance of the fourth capacitor C4, the capacitance of the fifth capacitor C5, the capacitance of the sixth capacitor C6, and the capacitance of the seventh capacitor C7, and to increase the capacitance of the eighth capacitor C8.

Although the seventh compensation pattern RP7 may be integrated with the eighth connection line 208, the seventh compensation pattern RP7 extends in a direction opposite to the first direction (X-axis direction), and thus there is an advantage of not influencing the resistance of the eighth connection line 208.

Figure 13:
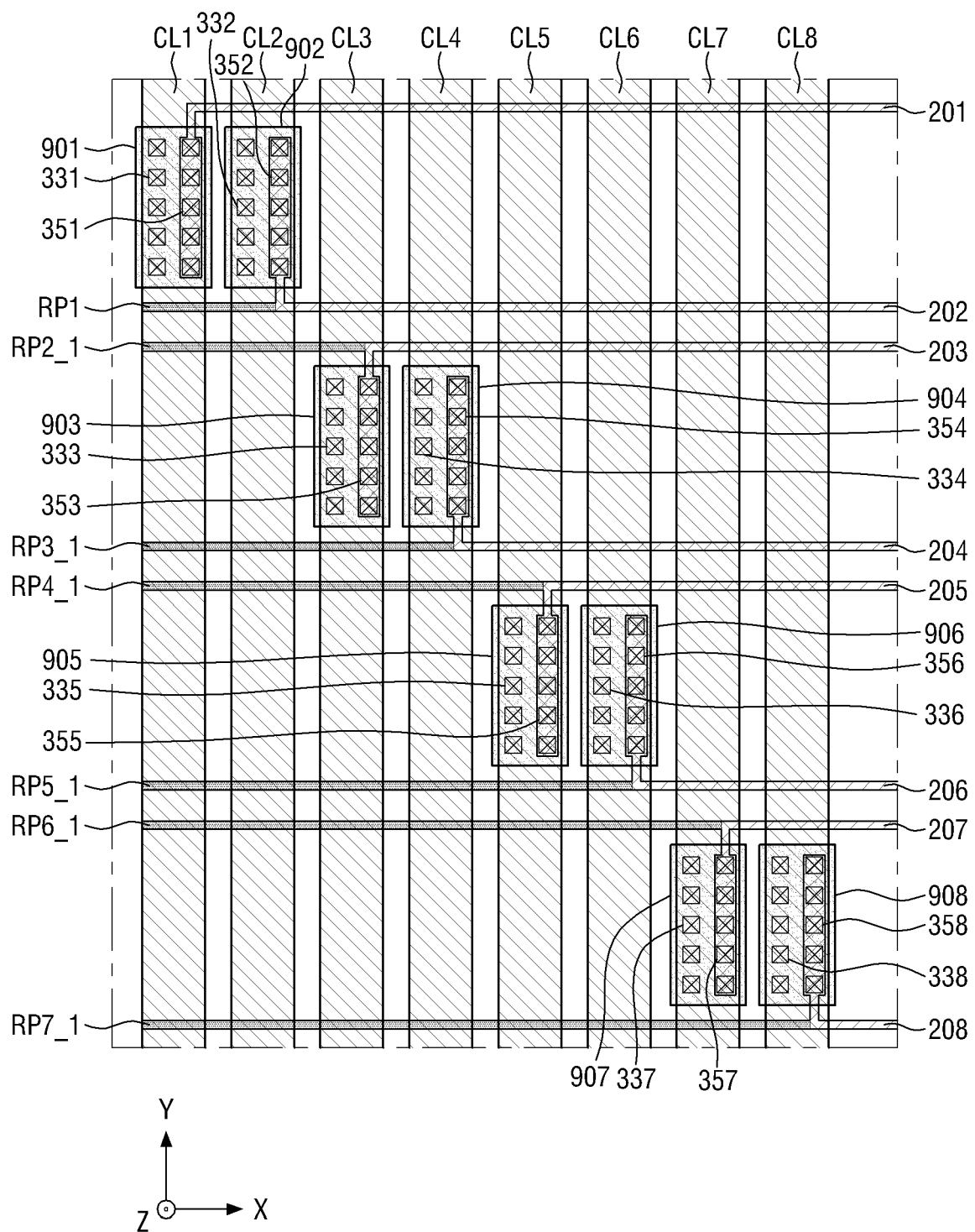
FIG. 13 is a schematic view showing structural relations between clock lines and compensation patterns according to an embodiment.

FIG. 13 is a schematic view showing structural relations between clock lines and compensation patterns according to an embodiment. The embodiment of FIG. 13 is different from the embodiment of FIG. 5 in that ends of second to seventh compensation patterns RP2_1 to RP7_1 are aligned/coplanar with and/or may coincide with the side surface of a first clock line CL1 in the second direction (Y-axis direction). Description related to structures analogous/identical to structures of the embodiment of FIG. 5 may not be repeated.

Referring to FIG. 13, ends of the second to seventh compensation patterns RP2_1 to RP7_1 may be connected to the third to eighth connection lines 203 to 208, respectively, and other ends of the second to seventh compensation patterns RP2_1 to RP7_1 may be aligned/coplanar with and/or may coincide with the side surface of the first clock line CL1 in the second direction (Y-axis direction). Without the structures illustrated in FIG. 13, the capacitance of the first capacitor C1 (illustrated in FIG. 4) may be considerably larger than the capacitance of each of the second to eighth capacitors C2 to C8. With the structure illustrated in FIG. 13, since each of the second to seventh compensation patterns RP2_1 to RP7_1 may overlap the first clock line CL1, the capacitance of the first capacitor C1 may be effectively reduced to balance with the second to eighth capacitors C2 to C8.

Figure 14:
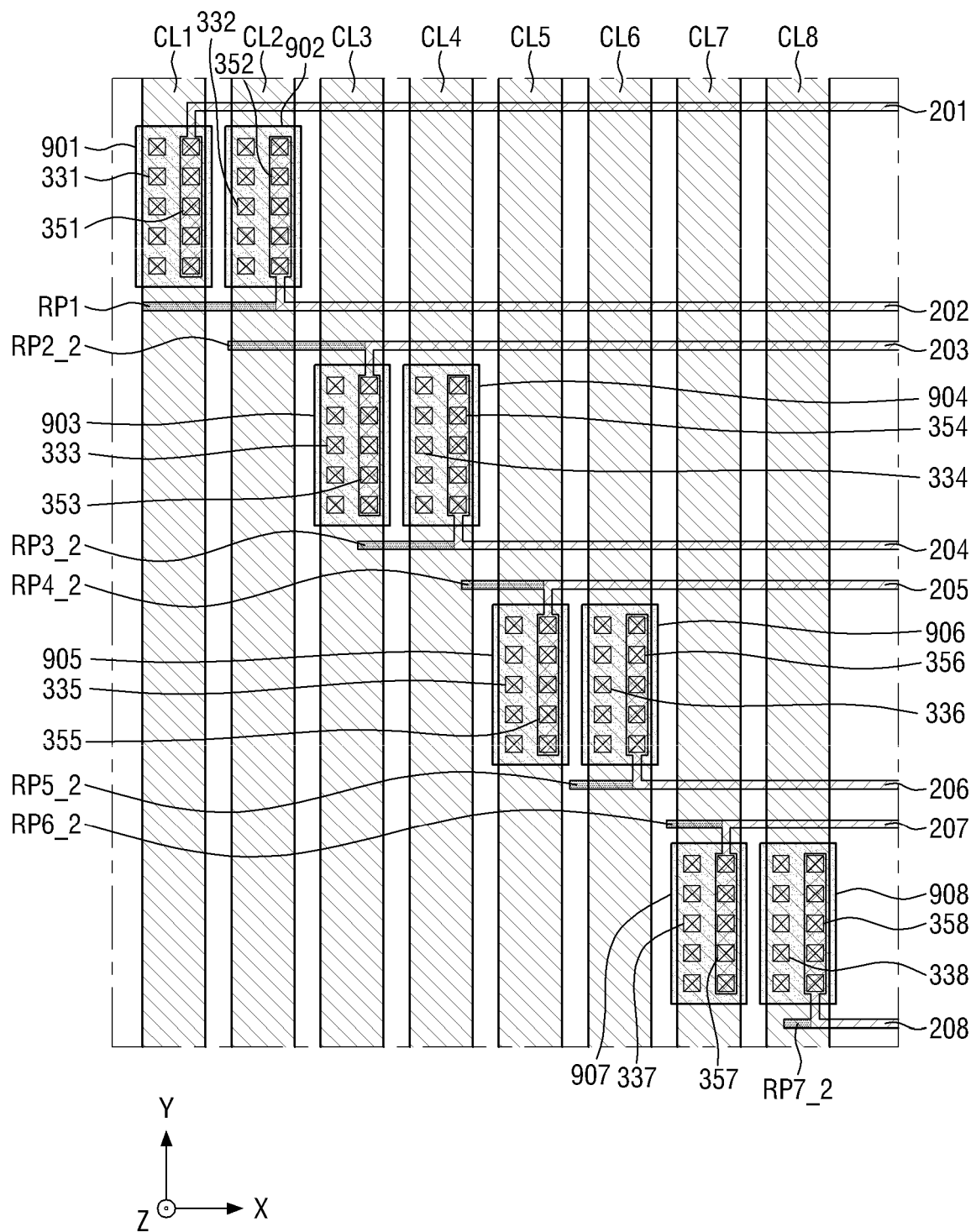
FIG. 14 is a schematic view showing structural relations between clock lines and compensation patterns according to an embodiment.

FIG. 14 is a schematic view showing structural relations between clock lines and compensation patterns according to an embodiment. The embodiment of FIG. 14 is different from the embodiment of FIG. 5 in that the areas of second to seventh compensation patterns RP2_2 to RP7_2 are sequentially reduced. Description related to structures analogous/identical to structures of the embodiment of FIG. 5 may not be repeated.

Referring to FIG. 14, the first compensation pattern RP1 of this embodiment may be the same as that of the embodiment of FIG. 5 in order to reduce the capacitance of the first capacitor C1. One end of the first compensation pattern RP1 may be in contact with the second connection line 202; another end of the first compensation pattern RP1 may be aligned/coplanar with and/or may coincide with a side surface of the first clock line CL1 in the second direction (Y-axis direction).

The areas of the second to seventh compensation patterns RP2_2 to RP7_2 may be sequentially reduced based on the first compensation pattern RP1. The area of the second compensation pattern RP2_2 may be smaller than the area of the first compensation pattern RP1, and the second compensation pattern RP2_2 may overlap a part of the third clock line CL3 and the second clock line CL2 in the third direction (Z-axis direction).

The area of the third compensation pattern RP3_2 may be smaller than the area of the second compensation pattern RP2_2, and the third compensation pattern RP3_2 may overlap a part of the fourth clock line CL4 and a part of the third clock line CL3 in the third direction (Z-axis direction).

The area of the fourth compensation pattern RP4_2 may be smaller than the area of the third compensation pattern RP3_2, and the fourth compensation pattern RP4_2 may overlap a part of the fifth clock line CL5 and a part of the fourth clock line CL4 in the third direction (Z-axis direction).

The area of the fifth compensation pattern RP5_2 may be smaller than the area of the fourth compensation pattern RP4_2, and the fifth compensation pattern RP5_2 may overlap a part of the sixth clock line CL6 in the third direction (Z-axis direction).

The area of the sixth compensation pattern RP6_2 may be smaller than the area of the fifth compensation pattern RP5_2, and the sixth compensation pattern RP6_2 may overlap a part of the seventh clock line CL7 in the third direction (Z-axis direction).

The area of the seventh compensation pattern RP7_2 may be smaller than the area of the sixth compensation pattern RP6_2, and the seventh compensation pattern RP7_2 may overlap a part of the eighth clock line CL8 in the third direction (Z-axis direction).

Figure 15:
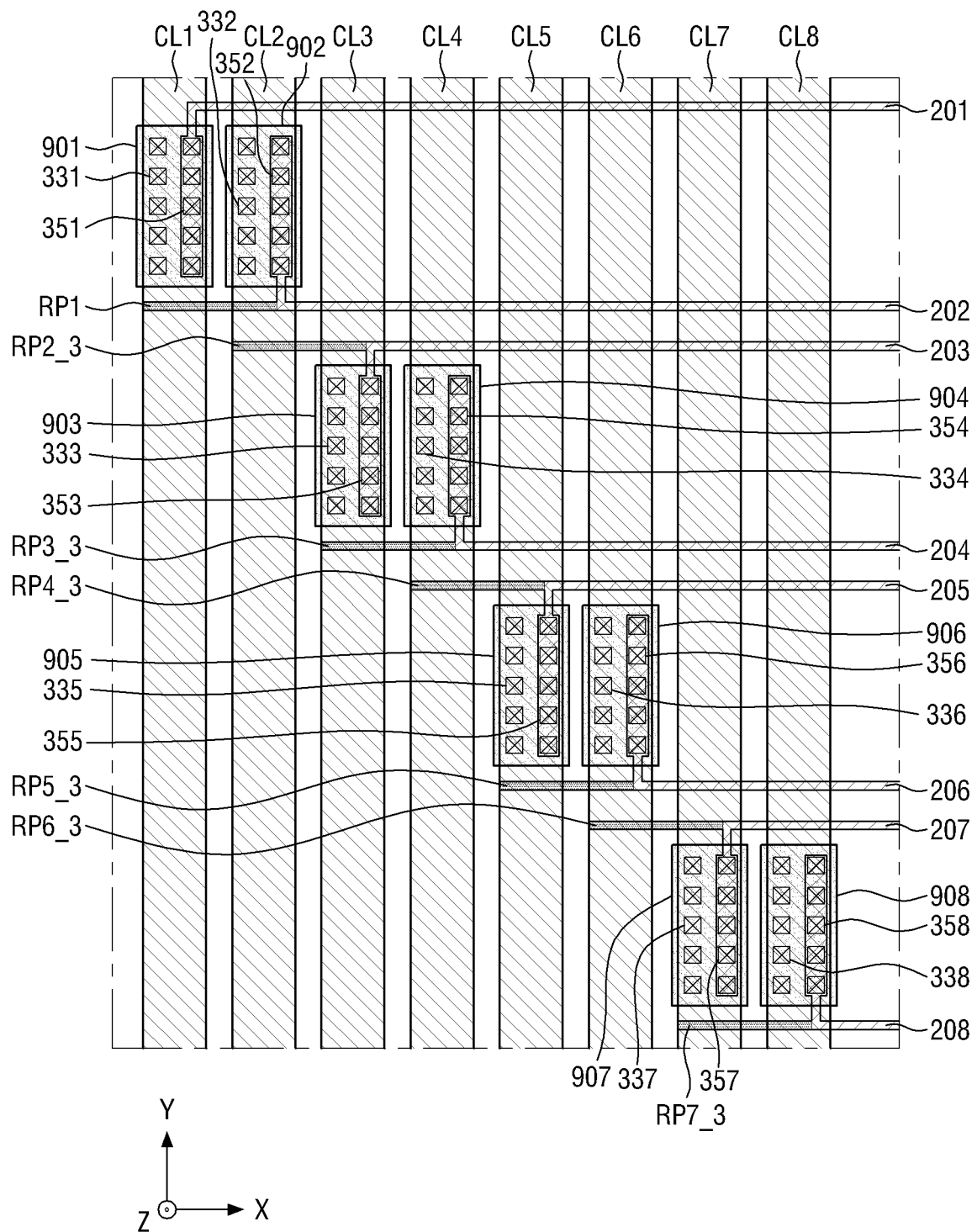
FIG. 15 is a schematic view showing structural relations between clock lines and compensation patterns according to an embodiment.

FIG. 15 is a schematic view showing structural relations between clock lines and compensation patterns according to an embodiment. The embodiment of FIG. 15 is different from the embodiment of FIG. 5 in that the area of each of second to seventh compensation patterns RP2_3 to RP7_3 is the same as that of the first compensation pattern RP1. Description related to structures analogous/identical to structures of the embodiment of FIG. 5 may not be repeated.

Referring to FIG. 15, the first compensation pattern RP1 of this embodiment may be the same as that of the embodiment of FIG. 5 in order to reduce the capacitance of the first capacitor C1.

All of the areas of the second to seventh compensation patterns RP2_3 to RP7_3 may be the same as (i.e., equal to) each other and maybe equal to the area of the first compensation pattern RP1. The second compensation pattern RP2_3 may overlap a part of the third clock line CL3 and the second clock line CL2 in the third direction (Z-axis direction), the third compensation pattern RP3_3 may overlap a part of the fourth clock line CL4 and the third clock line CL3 in the third direction (Z-axis direction), the fourth compensation pattern RP4_3 may overlap a part of the fifth clock line CL5 and the fourth clock line CL2 in the third direction (Z-axis direction), the fifth compensation pattern RP5_3 may overlap a part of the sixth clock line CL6 and the fifth clock line CL5 in the third direction (Z-axis direction), the sixth compensation pattern RP6_3 may overlap a portion of the seventh clock line CL7 and the sixth clock line CL6 in a third direction (Z-axis direction), and the seventh compensation pattern RP7_3 may overlap a part of the eighth clock line CL8 and the seventh clock line CL7 in the third direction (Z-axis direction).

An end of the first compensation pattern RP1 may be aligned/coplanar with and/or may coincide with a side surface of the first clock line CL1 in the second direction (Y-axis direction). The side surface of the first clock line CL1 refers to a side surface disposed in a direction opposite to the first direction (X-axis direction) relative to a side surface of the first clock line CL1 that intersects the first compensation pattern RP1. An end of the second compensation pattern RP2_3 may be aligned with a side surface of the second clock line CL2 in the second direction (Y-axis direction), an end of the third compensation pattern RP3_3 may be aligned with a side surface of the third clock line CL3 in the second direction (Y-axis direction), an end of the fourth compensation pattern RP4_3 may be aligned with a side of the fourth clock line CL4 in the second direction (Y-axis direction), an end of the fifth compensation pattern RP5_3 may be aligned with a side surface of the fifth clock line CL5 in the second direction (Y-axis direction), an end of the sixth compensation pattern RP6_3 may be aligned with a side surface of the sixth clock line CL6 in the second direction (Y-axis direction), and an end of the seventh compensation pattern RP7_3 may be aligned with a side surface of the seventh clock line CL7 in the second direction (Y-axis direction).

Figure 16:
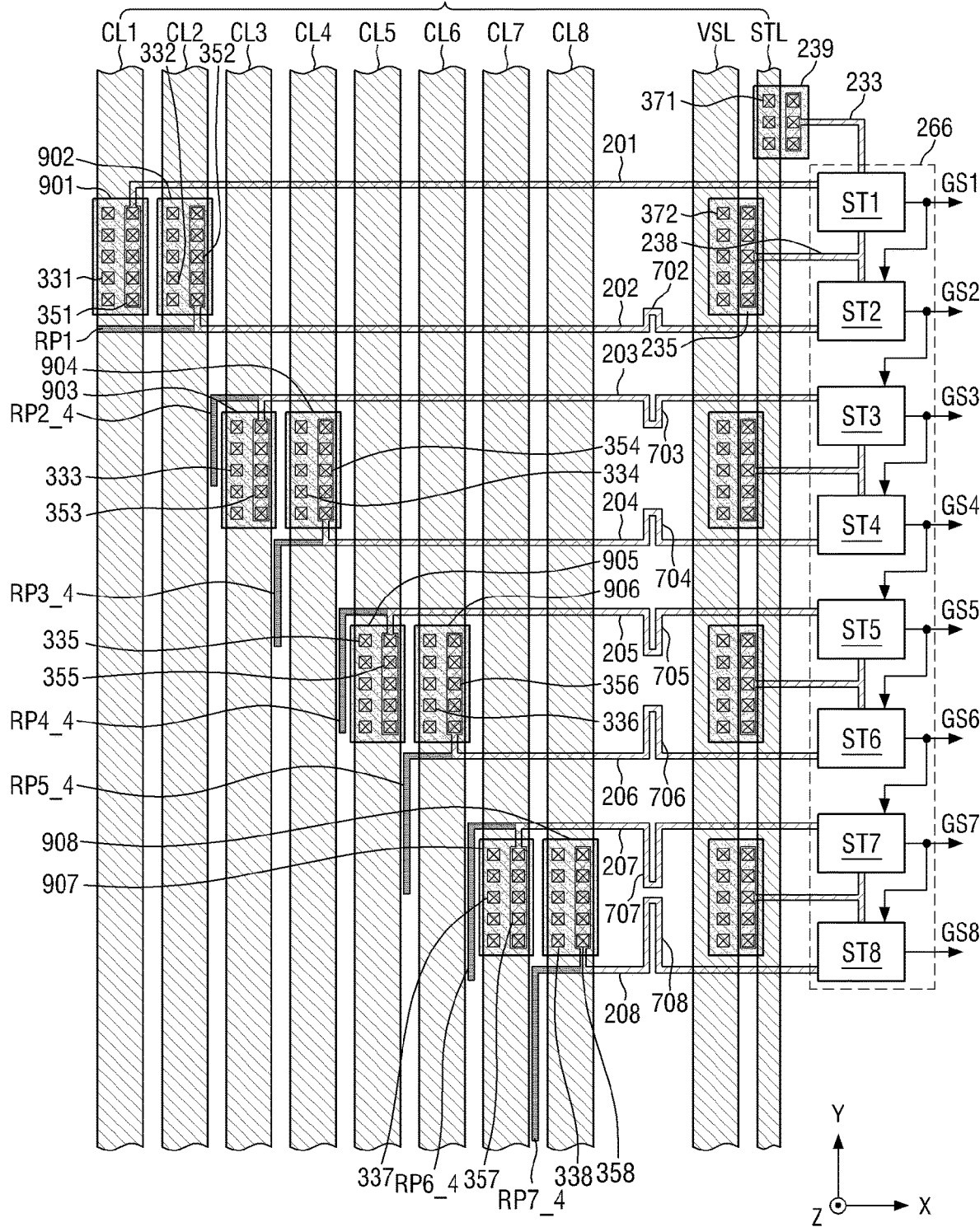
FIG. 16 is a schematic view showing connections between the gate control line and grate driver of FIG. 1 according to an embodiment.
Figure 17:
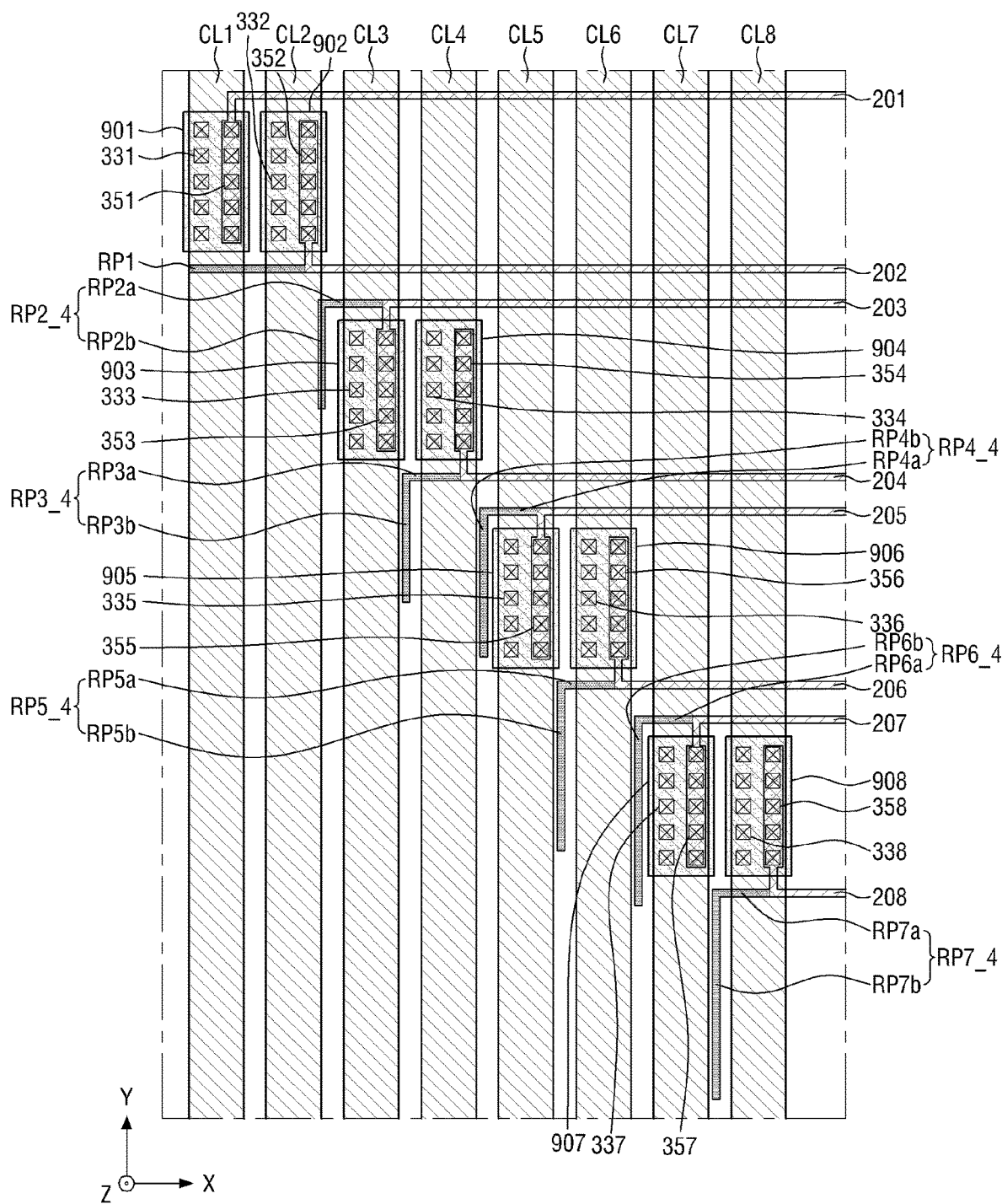
FIG. 17 is a schematic view showing structural relations between clock lines and compensation patterns according to an embodiment.

FIG. 16 is a schematic view showing connections between a gate control line and a grate driver according to an embodiment, and FIG. 17 is a schematic view showing structural relations between clock lines and compensation patterns according to an embodiment. The embodiment of FIGS. 16 and 17 is different from the embodiment of FIG. 5 in that each of second to seventh compensation patterns RP2_4 to RP7_4 includes a horizontal portion and a vertical portion. Description related to structures analogous/identical to structures of the embodiment of FIG. 5 may not be repeated.

Referring to FIGS. 16 and 17, the first compensation pattern RP1 of this embodiment may be the same as that of the embodiment of FIG. 5 in order to reduce the capacitance of the first capacitor C1. Each of the second to seventh compensation patterns RP2_4 to RP7_4 includes a horizontal portion and a vertical portion.

The second compensation pattern RP2_4 may include a horizontal portion RP2*a* extending in a direction opposite to the first direction (X-axis direction) and a vertical portion RP2*b* extending from an end of the horizontal portion RP2*a* in a direction opposite to the second direction (Y-axis direction). One end of the horizontal portion RP2*a* of the second compensation pattern RP2_4 may be connected to the third connection line 203, and another end of the horizontal portion RP2*a* of the second compensation pattern RP2_4 may be connected to the vertical portion RP2*b* of the second compensation pattern RP2_4.

The horizontal portion RP2*a* of the second compensation pattern RP2_4 may overlap a part of the third clock line CL3 in the third direction (Z-axis direction), and the vertical portion RP2*b* of the second compensation pattern RP2_4 may be disposed between the second clock line CL2 and the third clock line CL3 and may not overlap the second clock line CL2 and the third clock line CL3 in the third direction (Z-axis direction). In embodiments, the vertical portion RP2*b* of the second compensation pattern RP2_4 may be partially disposed between the second clock line CL2 and the third clock line CL3, and/or may partially overlap the second clock line CL2 and/or the third clock line CL3 in the third direction (Z-axis direction).

The area of the second compensation pattern RP2_4 including the horizontal portion RP2*a* and the vertical portion RP2*b* may be larger than the area of the first compensation pattern RP1.

The third compensation pattern RP3_4 may include a horizontal portion RP3*a* extending in a direction opposite to the first direction (X-axis direction) and a vertical portion RP3*b* extending from an end of the horizontal portion RP3*a* in a direction opposite to the second direction (Y-axis direction). One end of the horizontal portion RP3*a* of the third compensation pattern RP3_4 may be connected to the fourth connection line 204, and another end of the horizontal portion RP3*a* of the third compensation pattern RP3_4 may be connected to the vertical portion RP3*b* of the third compensation pattern RP3_4.

The horizontal portion RP3*a* of the third compensation pattern RP3_4 may overlap a part of the fourth clock line CL4 in the third direction (Z-axis direction), and the vertical portion RP3*b* of the third compensation pattern RP3_4 may be disposed between the third clock line CL3 and the fourth clock line CL4 and may not overlap the third clock line CL3 and the fourth clock line CL4 in the third direction (Z-axis direction). partially In embodiments, the vertical portion RP3*b* of the third compensation pattern RP3_4 may be disposed between the third clock line CL3 and the fourth clock line CL4, and/or may partially overlap the third clock line CL3 and/or the fourth clock line CL4 in the third direction (Z-axis direction).

The area of the third compensation pattern RP3_4 including the horizontal portion RP3*a* and the vertical portion RP3*b* may be larger than the area of the second compensation pattern RP2. The area of the horizontal portion RP3*a* of the third compensation pattern RP3_4 may be substantially equal to the area of the horizontal portion RP2*a* of the second compensation pattern RP2_4, but the area of the vertical portion RP3*b* of the third compensation pattern RP3_4 may be larger than the area of the vertical portion RP2*b* of the second compensation pattern RP2_4.

The fourth compensation pattern RP4_4 may include a horizontal portion RP4*a* extending in a direction opposite to the first direction (X-axis direction) and a vertical portion RP4*b* extending from an end of the horizontal portion RP4*a* in a direction opposite to the second direction (Y-axis direction). One end of the horizontal portion RP4*a* of the fourth compensation pattern RP4_4 may be connected to the fifth connection line 205, and another end of the horizontal portion RP4*a* of the fourth compensation pattern RP4_4 may be connected to the vertical portion RP4*b* of the fourth compensation pattern RP4_4.

The horizontal portion RP4*a* of the fourth compensation pattern RP4_4 may overlap a part of the fifth clock line CL5 in the third direction (Z-axis direction), and the vertical portion RP4*b* of the fourth compensation pattern RP4_4 may be disposed between the fourth clock line CL4 and the fifth clock line CL5 and may not overlap the fourth clock line CL4 and the fifth clock line CL5 in the third direction (Z-axis direction). In embodiments, the vertical portion RP4*b* of the fourth compensation pattern RP4_4 may be partially disposed between the fourth clock line CL4 and the fifth clock line CL5, and/or may partially overlap the fourth clock line CL4 and/or the fifth clock line CL5 in the third direction (Z-axis direction).

The area of the fourth compensation pattern RP4_4 including the horizontal portion RP4*a* and the vertical portion RP4*b* may be larger than the area of the third compensation pattern RP3_4. The area of the horizontal portion RP4*a* of the fourth compensation pattern RP4_4 may be substantially equal to the area of the horizontal portion RP3*a* of the third compensation pattern RP3_4, but the area of the vertical portion RP4*b* of the fourth compensation pattern RP4_4 may be larger than the area of the vertical portion RP3*b* of the third compensation pattern RP3_4.

The fifth compensation pattern RP5_4 may include a horizontal portion RP5*a* extending in a direction opposite to the first direction (X-axis direction) and a vertical portion RP5*b* extending from an end of the horizontal portion RP5*a* in a direction opposite to the second direction (Y-axis direction). One end of the horizontal portion RP5*a* of the fifth compensation pattern RP5_4 may be connected to the sixth connection line 206, and another end of the horizontal portion RP5*a* of the fifth compensation pattern RP5_4 may be connected to the vertical portion RP5*b* of the fifth compensation pattern RP5_4.

The horizontal portion RP5*a* of the fifth compensation pattern RP5_4 may overlap a part of the sixth clock line CL6 in the third direction (Z-axis direction), and the vertical portion RP5*b* of the fifth compensation pattern RP5_4 may be disposed between the fifth clock line CL5 and the sixth clock line CL6 and may not overlap the fifth clock line CL5 and the sixth clock line CL6 in the third direction (Z-axis direction). In embodiments, the vertical portion RP5*b* of the fifth compensation pattern RP5_4 may be partially disposed between the fifth clock line CL5 and the sixth clock line CL6, and/or may partially overlap the fifth clock line CL5 and/or the sixth clock line CL6 in the third direction (Z-axis direction).

The area of the fifth compensation pattern RP5_4 including the horizontal portion RP5*a* and the vertical portion RP5*b* may be larger than the area of the fourth compensation pattern RP4_4. The area of the horizontal portion RP5*a* of the fifth compensation pattern RP5_4 may be substantially equal to the area of the horizontal portion RP4*a* of the fourth compensation pattern RP4_4, but the area of the vertical portion RP5*b* of the fifth compensation pattern RP5_4 may be larger than the area of the vertical portion RP4*b* of the fourth compensation pattern RP4_4.

The sixth compensation pattern RP6_4 may include a horizontal portion RP6*a* extending in a direction opposite to the first direction (X-axis direction) and a vertical portion RP6*b* extending from an end of the horizontal portion RP6*a* in a direction opposite to the second direction (Y-axis direction). One end of the horizontal portion RP6*a* of the sixth compensation pattern RP6_4 may be connected to the seventh connection line 207, and another end of the horizontal portion RP6*a* of the sixth compensation pattern RP6_4 may be connected to the vertical portion RP6*b* of the sixth compensation pattern RP6_4.

The horizontal portion RP6*a* of the sixth compensation pattern RP6_4 may overlap a part of the seventh clock line CL7 in the third direction (Z-axis direction), and the vertical portion RP6*b* of the sixth compensation pattern RP6_4 may be disposed between the sixth clock line CL6 and the seventh clock line CL7 and may not overlap the sixth clock line CL6 and the seventh clock line CL7 in the third direction (Z-axis direction). In embodiments, the vertical portion RP6*b* of the sixth compensation pattern RP6_4 may be partially disposed between the sixth clock line CL6 and the seventh clock line CL7, and/or may partially overlap the sixth clock line CL6 and/or the seventh clock line CL7 in the third direction (Z-axis direction).

The area of the sixth compensation pattern RP6_4 including the horizontal portion RP6*a* and the vertical portion RP6*b* may be larger than the area of the fifth compensation pattern RP5_4. The area of the horizontal portion RP6*a* of the sixth compensation pattern RP6_4 may be substantially equal to the area of the horizontal portion RP5*a* of the fifth compensation pattern RP5_4, but the area of the vertical portion RP6*b* of the sixth compensation pattern RP6_4 may be larger than the area of the vertical portion RP5*b* of the fifth compensation pattern RP5_4.

The seventh compensation pattern RP7_4 may include a horizontal portion RP7*a* extending in a direction opposite to the first direction (X-axis direction) and a vertical portion RP7b extending from an end of the horizontal portion RP7a in a direction opposite to the second direction (Y-axis direction). One end of the horizontal portion RP7a of the seventh compensation pattern RP7_4 may be connected to the eighth connection line 208, and another end of the horizontal portion RP7a of the seventh compensation pattern RP7_4 may be connected to the vertical portion RP7b of the seventh compensation pattern RP7_4.

The horizontal portion RP7a of the seventh compensation pattern RP7_4 may overlap a part of the eighth clock line CL8 in the third direction (Z-axis direction), and the vertical portion RP7b of the seventh compensation pattern RP7_4 may be disposed between the seventh clock line CL7 and the eighth clock line CL8 and may not overlap the seventh clock line CL7 and the eighth clock line CL8 in the third direction (Z-axis direction). In embodiments, the vertical portion RP7b of the seventh compensation pattern RP7_4 may be partially disposed between the seventh clock line CL7 and the eighth clock line CL8, and/or may partially overlap the seventh clock line CL7 and/or the eighth clock line CL8 in the third direction (Z-axis direction).

The area of the seventh compensation pattern RP7_4 including the horizontal portion RP7a and the vertical portion RP7b may be larger than the area of the sixth compensation pattern RP6_4. The area of the horizontal portion RP7a of the seventh compensation pattern RP7_4 may be substantially equal to the area of the horizontal portion RP6a of the sixth compensation pattern RP6_4, but the area of the vertical portion RP7b of the seventh compensation pattern RP7_4 may be larger than the area of the vertical portion RP6b of the sixth compensation pattern RP6_4.

Figure 18:
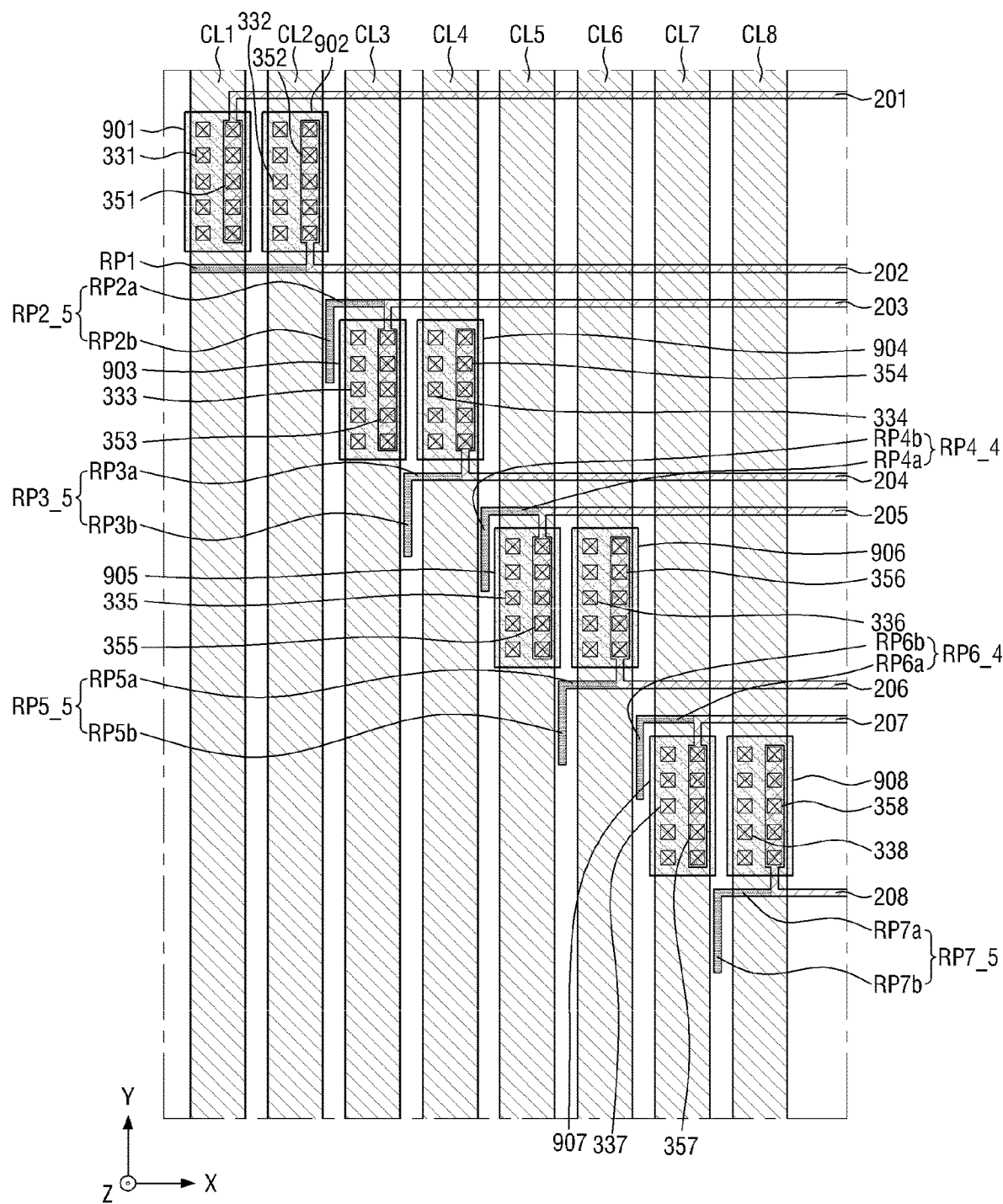
FIG. 18 is a schematic view showing structural relations between clock lines and compensation patterns according to an embodiment.

FIG. 18 is a schematic view showing structural relations between clock lines and compensation patterns according to an embodiment. The embodiment of FIG. 18 is different from the embodiment of FIGS. 16 and 17 in that the area of each of second to seventh compensation patterns RP2_4 to RP7_5 is substantially equal to the area of the first compensation pattern RP1. Description related to structures analogous/identical to structures of the embodiment of FIGS. 16 and 17 may not be repeated.

Referring to FIG. 18, the first compensation pattern RP1 of this embodiment may be the same as that of the embodiment of FIG. 5 in order to reduce the capacitance of the first capacitor C1. Each of the second to seventh compensation patterns RP2_5 to RP7_5 includes a horizontal portion and a vertical portion.

The area of the second compensation pattern RP2_5 including the horizontal portion RP2a and the vertical portion RP2b may be substantially equal to the area of the first compensation pattern RP1. The area of the third compensation pattern RP3_5 including the horizontal portion RP3a and the vertical portion RP3b may be substantially equal to the area of the second compensation pattern RP2_5 including the horizontal portion RP2a and the vertical portion RP2b. The area of the fourth compensation pattern RP4_5 including the horizontal portion RP4a and the vertical portion RP4b may be substantially equal to the area of the third compensation pattern RP3_5 including the horizontal portion RP3a and the vertical portion RP3b. The area of the fifth compensation pattern RP5_5 including the horizontal portion RP5a and the vertical portion RP5b may be substantially equal to the area of the fourth compensation pattern RP4_5 including the horizontal portion RP4a and the vertical portion RP4b. The area of the sixth compensation pattern RP6_5 including the horizontal portion RP6a and the vertical portion RP6b may be substantially equal to the area of the fifth compensation pattern RP5_5 including the horizontal portion RP5a and the vertical portion RP5b. The area of the seventh compensation pattern RP7_5 including the horizontal portion RP7a and the vertical portion RP7b may be substantially equal to the area of the sixth compensation pattern RP6_5 including the horizontal portion RP6a and the vertical portion RP6b.

Figure 19:
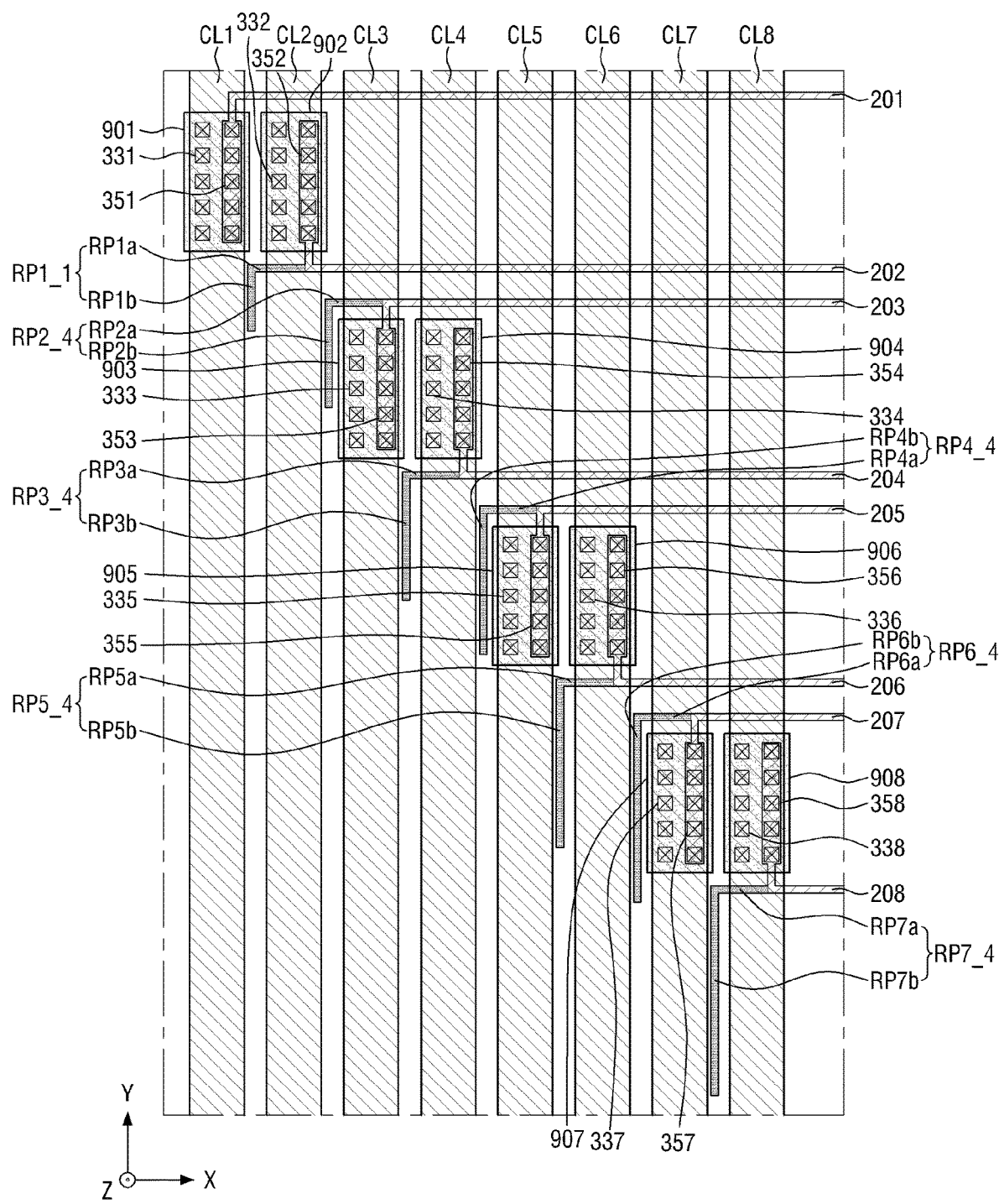
FIG. 19 is a schematic view showing structural relations between clock lines and compensation patterns according to another embodiment.

FIG. 19 is a schematic view showing structural relations between clock lines and compensation patterns according to another embodiment. The embodiment of FIG. 19 is different from the embodiment of FIGS. 16 and 17 in that the first compensation pattern RP1_1 includes a horizontal portion RP1a and a vertical portion RP1b. Description related to structures analogous/identical to structures of the embodiment of FIGS. 16 and 17 may not be repeated.

Referring to FIG. 19, the first compensation pattern RP1_1 may include a horizontal portion RP1a extending in a direction opposite to the first direction (X-axis direction) and a vertical portion RP1b extending from an end of the horizontal portion RP1a in a direction opposite to the second direction (Y-axis direction). One end of the horizontal portion RP1a of the first compensation pattern RP1_1 may be connected to the second connection line 202, and another end of the horizontal portion RP1a of the first compensation pattern RP1_1 may be connected to the vertical portion RP1b of the first compensation pattern RP1_1.

The horizontal portion RP1a of the first compensation pattern RP1_1 may overlap a part of the second clock line CL2 in the third direction (Z-axis direction), and the vertical portion RP1b of the first compensation pattern RP1_1 may be disposed between the first clock line CL1 and the second clock line CL2 and may not overlap the first clock line CL1 and the second clock line CL2 in the third direction (Z-axis direction). In embodiments, the vertical portion RP1b of the first compensation pattern RP1_1 may be partially disposed between the first clock line CL1 and the second clock line CL2, and/or may partially overlap the first clock line CL1 and/or the second clock line CL2 in the third direction (Z-axis direction).

According embodiments, in a display device, compensation patterns may extend in a direction opposite to connection lines (which connect clock lines and a gate driver) to implement substantially uniform capacitances between the clock lines and a common electrode, without significantly influence the resistances of the connection lines. Advantageously, unwanted horizontal stripes may be prevented in images displayed by the display device, and satisfactory image display quality of the display device may be attained.

Although the example embodiments have been disclosed for illustrative purposes, various modifications, additions, and substitutions are possible, without departing from the scope defined in the accompanying claims.

What is claimed is:

1. A display device, comprising:
   gate lines;
   clock lines;
   a gate driver electrically connected to the gate lines and disposed between the gate lines and the clock lines;
   connection lines electrically connected to the clock lines and configured to transmit clock signals to the gate driver; and
   compensators respectively electrically connected to the connection lines,
   wherein one of the clock lines is electrically connected to one of the compensators and is electrically connected to one of the connection lines, and wherein the one of the clock lines is positioned between a first section of the one of the compensators and a first section of the one of the connection lines in a width direction of the one of the clock lines and is overlapped by the one of the compensators in a thickness direction of the one of the clock lines.

2. The display device of claim 1,
wherein the clock lines comprise a first clock line and a second clock line,
wherein the second clock line is positioned between the first clock line and the gate driver,
wherein the connection lines comprise a first connection line and a second connection line,
wherein the first clock line is electrically connected through the first connection line to the gate driver,
wherein the second clock line is electrically connected through the second connection line to the gate driver,
wherein the compensators comprise a first compensator,
wherein the first compensator is electrically connected to each of the second clock line and the second connection line,
wherein the second clock line is positioned between a first section of the first compensator and a first section of the second connection line, and
wherein the first section of the first compensator overlaps the first clock line or is positioned between the first clock line and the second clock line, or an edge of the first compensator and an edge of the first clock line are positioned in a same line in a plan view of the display device.

3. The display device of claim 2,
wherein the clock lines comprise a third clock line positioned between the second clock line and the gate driver,
wherein the connection lines comprise a third connection line electrically connecting the third clock line to the gate driver,
wherein the compensators comprise a second compensator electrically connected to each of the third clock line and the third connection line,
wherein the third clock line is positioned between a first section of the second compensator and a first section of the third connection line, and
wherein the first section of the second compensator overlaps at least one of the first clock line and the second clock line of is positioned between the second clock line and the third clock line.

4. The display device of claim 3,
wherein an area of the second compensator is larger than an area of the first compensator in a plan view of the display device.

5. The display device of claim 3,
wherein an area in which the second compensator overlaps the first clock line is smaller than an area in which the first compensator overlaps the first clock line.

6. The display device of claim 3,
wherein an end of the second compensator is aligned with a side of the first clock line in a plan view of the display device.

7. The display device of claim 3,
wherein the clock lines comprise a fourth clock line positioned between the third clock line and the gate driver,
wherein the connection lines comprise a fourth connection line electrically connecting the fourth clock line to the gate driver, wherein the compensators comprise a third compensator electrically connected to each of the fourth clock line and the fourth connection line,
wherein the fourth clock line is positioned between a first section of the third compensator and a first section of the fourth connection line, and
wherein the first section of the third compensator overlaps at least one of the first clock line, the second clock line, and the third clock line or is positioned between the third clock line and the fourth clock line.

8. The display device of claim 7,
wherein an area of the third compensator is larger than an area of the second compensator in a plan view of the display device.

9. The display device of claim 7,
wherein an area in which the third compensator overlaps the first clock line is smaller than an area in which the second compensator overlaps the first clock line.

10. The display device of claim 7,
wherein an end of the second compensator is aligned with a side of the first clock line in a plan view of the display device.

11. The display device of claim 7,
wherein the clock lines comprise a fifth clock line positioned between the fourth clock line and the gate driver,
wherein the connection lines comprise a fifth connection line electrically connecting the fifth clock line to the gate driver,
wherein the compensators comprise a fourth compensator electrically connected to each of the fifth clock line and the fifth connection line,
wherein the fifth clock line is positioned between a first section of the fourth compensator and a first section of the fifth connection line, and
wherein the first section of the fourth compensator overlaps at least one of the second clock line, the third clock line, and the fourth clock line or is positioned between the fourth clock line and the fifth clock line.

12. The display device of claim 11,
wherein an area of the fourth compensator is larger than an area of the third compensator in a plan view of the display device.

13. The display device of claim 11,
wherein the fourth compensator overlaps the first clock line, and
wherein an end of the fourth compensator is aligned with a side of the first clock line in a plan view of the display device.

14. The display device of claim 7,
wherein the first section of the second compensator is electrically connected through a second section of the second compensator to the first section of the third connection line and is not aligned with the first section of the third connection line, and
wherein the second section of the second compensator overlaps the third clock line.

15. The display device of claim 14,
wherein the first section of the second compensator is disposed between the second clock line and the third clock line.

16. The display device of claim 14,
wherein the first section of the second compensator partially overlaps at least one the second clock line and the third clock line.

17. The display device of claim 14,
wherein the first section of the third compensator is electrically connected through a second section of the third compensator to the first section of the fourth connection line and is not aligned with the first section of the fourth connection line, wherein the second section of the second compensator is aligned with the first section of the third connection line and is directly connected to the third connection line, wherein the second section of the third compensator is aligned with the first section of the fourth connection line and is directly connected to the fourth connection line, and wherein a total area of the second section of the second compensator is substantially equal to a total area of the second section of the third compensator in a plan view of the display device.

18. The display device of claim 14, wherein the first section of the third compensator is electrically connected through a second section of the third compensator to the first section of the fourth connection line, is not aligned with the first section of the fourth connection line, and is larger than the first section of the second compensator.

19. The display device of claim 14, wherein the first section of the third compensator is electrically connected through a second section of the third compensator to the first section of the fourth connection line and is not aligned with the first section of the fourth connection line, wherein the second section of the second compensator is aligned with the first section of the third connection line and is directly connected to the third connection line, wherein the second section of the third compensator is aligned with the first section of the fourth connection line and is directly connected to the fourth connection line, and wherein a total area of the first section of the second compensator is substantially equal to a total area of the first section of the third compensator in a plan view of the display device.

20. A display device, comprising:

gate lines;

clock lines;

a gate driver electrically connected to the gate lines and disposed between the gate lines and the clock lines;

connection lines electrically connected to the clock lines and configured to transmit clock signals to the gate driver; and compensators respectively electrically connected to the connection lines, wherein the clock lines comprise a first clock line and a second clock line, wherein the second clock line is positioned between the first clock line and the gate driver, wherein the connection lines comprise a first connection line and a second connection line, wherein the first clock line is electrically connected through the first connection line to the gate driver, wherein the second clock line is electrically connected through the second connection line to the gate driver, wherein the compensators comprise a first compensator, wherein the first compensator is electrically connected to each of the second clock line and the second connection line, wherein the second clock line is positioned between a section of the first compensator and a section of the second connection line, and wherein a longest edge of the first compensator is not parallel to a longest edge of the first clock line in a plan view of the display device.

* * * * *